United States Patent
Ryan

(10) Patent No.: US 10,583,851 B2
(45) Date of Patent: Mar. 10, 2020

(54) FOOD, WATER AND VITAL SUPPLIES STORAGE AND TRANSPORT CART

(71) Applicant: Gregory Joseph Ryan, Amity Harbor, NY (US)

(72) Inventor: Gregory Joseph Ryan, Amity Harbor, NY (US)

(73) Assignee: Allpillars, Inc., Amity Harbor, NY (US)

(*) Notice: Subject to any disclaimer, the term of this patent is extended or adjusted under 35 U.S.C. 154(b) by 155 days.

(21) Appl. No.: 15/639,484

(22) Filed: Jun. 30, 2017

(65) Prior Publication Data
US 2017/0320509 A1    Nov. 9, 2017

Related U.S. Application Data

(63) Continuation-in-part of application No. 14/559,588, filed on Dec. 3, 2014, now Pat. No. 9,694,837, which
(Continued)

(51) Int. Cl.
*B62B 3/02* (2006.01)
*B65D 21/02* (2006.01)
(Continued)

(52) U.S. Cl.
CPC ............... *B62B 3/025* (2013.01); *B62B 3/02* (2013.01); *B65D 1/225* (2013.01); *B65D 1/46* (2013.01);
(Continued)

(58) Field of Classification Search
CPC ........... B62B 3/16; B62B 3/002; B62B 3/006; B65D 11/28; B65D 11/1833; B65D 11/184; B65D 11/1813; B65G 67/04
See application file for complete search history.

(56) References Cited

U.S. PATENT DOCUMENTS

| | | | |
|---|---|---|---|
| 489,711 A | * | 1/1893 | Mandioni ................ B65D 7/26 220/6 |
| 4,546,874 A | | 10/1985 | Kirchhan |
| | | | (Continued) |

FOREIGN PATENT DOCUMENTS

WO    2017064484 A    2/2018

OTHER PUBLICATIONS

Cisco-Eagle, "What Causes a Pallet Rack Collapse? How Can You Prevent It?", blog Jun. 24, 2016, http://www.cusci-eagle.com, 888-877-3861, 6 pages.
(Continued)

*Primary Examiner* — James A Shriver, II
*Assistant Examiner* — Vaughn Coolman
(74) *Attorney, Agent, or Firm* — Alfred M. Walker

(57) ABSTRACT

Collapsible reusable watertight carrying cases are provided in sizes varying from small containers to large sealable container bins on wheels, to provide large quantities of water to remote areas not served by public water supplies, or where water supplies are unavailable because of weather disasters. The cases are assembled or disassembled from a joined flat space-saving configuration to a functioning case and vice-versa. The sides of the cases are erected progressively by hand by interlocking elements at the corners. The panels also disassemble progressively by being manually pulled apart. When folded into a flat storage or shipping configuration, the panels stay together, resisting unfolding by virtue of snaps which are either molded into the panels or bonded to them. The carrying cases are resistant to water, dirt, bacteria, molds, allergens, and inclement weather.

18 Claims, 32 Drawing Sheets

Related U.S. Application Data is a continuation-in-part of application No. 14/488,569, filed on Sep. 17, 2014, now Pat. No. 9,550,602.

(60) Provisional application No. 62/007,054, filed on Jun. 3, 2014, provisional application No. 61/871,306, filed on Sep. 18, 2013.

(51) Int. Cl.
| | | |
|---|---|---|
| *B65D 43/16* | (2006.01) | |
| *B65D 1/46* | (2006.01) | |
| *B65D 1/22* | (2006.01) | |
| *B65D 21/032* | (2006.01) | |
| *B65D 25/30* | (2006.01) | |

(52) U.S. Cl.
CPC ......... *B65D 21/0223* (2013.01); *B65D 25/30* (2013.01); *B65D 43/168* (2013.01); *B65D 2313/00* (2013.01); *B65D 2313/02* (2013.01); *Y02W 30/807* (2015.05)

(56) References Cited

U.S. PATENT DOCUMENTS

| | | | | |
|---|---|---|---|---|
| 4,832,204 | A * | 5/1989 | Handy | B07C 3/00 209/3.3 |
| 4,896,786 | A | 1/1990 | Schupack et al. | |
| 6,155,481 | A * | 12/2000 | Rawlings | B65D 27/06 229/300 |
| 6,929,125 | B1 | 8/2005 | Seamans | |
| 8,786,407 | B2 * | 7/2014 | Liu | B65D 19/001 340/10.1 |
| 9,315,291 | B2 * | 4/2016 | Kelly | B65D 19/02 |
| 9,550,602 | B2 | 1/2017 | Ryan | |
| 9,676,515 | B2 * | 6/2017 | Huggett | B65D 13/04 |
| 9,884,718 | B2 * | 2/2018 | Parnall | B65D 90/14 |
| 2003/0141976 | A1 * | 7/2003 | Dickinson | B32B 7/06 340/572.8 |
| 2004/0026296 | A1 * | 2/2004 | Nesting | B65D 7/30 206/600 |
| 2005/0083213 | A1 * | 4/2005 | Stevens | G06Q 10/047 340/994 |
| 2005/0285386 | A1 * | 12/2005 | Dickinson | B32B 7/06 283/81 |
| 2006/0076263 | A1 * | 4/2006 | Schafer | A47L 13/59 206/576 |
| 2006/0174528 | A1 * | 8/2006 | Dickinson | B32B 7/06 40/638 |
| 2006/0213095 | A1 * | 9/2006 | Dickinson | B32B 7/06 40/312 |
| 2006/0216966 | A1 * | 9/2006 | Selek | B60P 1/6418 439/76.2 |
| 2007/0194022 | A1 * | 8/2007 | Huggett | B65D 13/04 220/6 |
| 2008/0035656 | A1 * | 2/2008 | Weinberg | A01K 7/00 220/810 |
| 2008/0115465 | A1 * | 5/2008 | Dickinson | A45C 13/021 53/476 |
| 2009/0266722 | A1 * | 10/2009 | Rogers | B65D 33/25 206/216 |
| 2011/0218933 | A1 * | 9/2011 | Hunsaker | G06Q 10/08355 705/338 |
| 2011/0297702 | A1 | 12/2011 | Hildebrandt et al. | |
| 2014/0166665 | A1 | 6/2014 | McNamara | |
| 2015/0076143 | A1 | 3/2015 | Ryan | |
| 2016/0221768 | A1 * | 8/2016 | Kadaba | B65G 67/04 |
| 2018/0004912 | A1 * | 1/2018 | Utech | G06F 19/3456 |

OTHER PUBLICATIONS

Pack Info, Article "Reducing the occurrence of collapsing pallet loads: Part 1". https://www.packworld.com/article/reducing-occurrence-callapsi . . . May 8, 2017, 11 pages.

* cited by examiner

FOOD, WATER AND VITAL SUPPLIES STORAGE AND TRANSPORT CART

RELATED APPLICATIONS

This application is a continuation-in-part of application Ser. No. 14/559,588 filed on Dec. 3, 2014, and claims priority under 35 U.S.C. § 120 therefrom. The '588 application is a continuation-in-part of application Ser. No. 14/488,569, filed on Sep. 17, 2014, now U.S. Pat. No. 9,550,602, issued Jan. 24, 2017, and claims priority under 35 U.S.C. § 120 therefrom. The '569 application claims benefit and priority of provisional application Ser. No. 61/871,306 filed Sep. 18, 2013 and provisional application Ser. No. 62/007,054 filed Jun. 3, 2014, under 35 U.S.C. § 119(e). The '588, '569, '306 and '054 applications are incorporated by reference herein.

FIELD OF THE INVENTION

The present invention relates to waterproof, collapsible, foldable and/or reusable carrying cases.

BACKGROUND OF THE INVENTION

The prior art reveals many patents describing collapsible, foldable, and/or reusable containers or carrying cases.

U.S. Pat. No. 6,293,418 of Ogden, U.S. Pat. No. 4,491,231 of Heggeland, et al., U.S. Pat. No. 4,820,383 of Shchamorov, U.S. Pat. No. 5,450,962 Uitz, U.S. Pat. No. 8,261,923 of Blanchard, U.S. Pat. No. 7,048,135 of Smyers, and U.S. Patent Application Publication number 2012/0091133 of Escarpa Gil, show molded plastic containers or boxes that are assembled or disassembled with the use of a variety of latches and hinges.

U.S. Pat. No. 5,016,753 of Henderson shows a variable height telescoping packaging system. U.S. Patent Application Publication number 2008/0190923 of Rovira Fontinals, et al. describes foldable container with a rigid base which may include wheels. U.S. Pat. No. 4,503,973 of Anderson discloses a corrugated cardboard box with a rigid base incorporating reinforcing plates with wheels or casters.

U.S. Pat. No. 4,804,136 of Hall, U.S. Pat. No. 4,901,911 of Drexhage, U.S. Pat. No. 5,295,632 of Zink, U.S. Pat. No. 5,913,474 of Chu, U.S. Pat. No. 5,996,885 of Chu, U.S. Pat. No. 6,427,907 of Espinoza, U.S. Pat. No. 6,460,724 of Bradford, U.S. Pat. No. 6,474,541 of Chu, U.S. Pat. No. 6,547,127 of Bradford, U.S. Pat. No. 6,564,993 of Wassink, U.S. Pat. No. 6,651,875 of Chu, U.S. Pat. No. 6,688,516 of Ussen, and U.S. Pat. No. 6,824,042 generally incorporate foldable sections of corrugated cardboard or similar plastic panels with plastic or metal molded reinforcing elements.

OBJECTS OF THE INVENTION

However, the above noted prior art does not reveal collapsible reusable carrying cases of a wide variety of sizes, preferably waterproof, that can be constructed of molded plastic panels, with integral fittings or of corrugated plastic panels, with attached molded fittings that assemble by progressively engaging the side edges and fold on living hinges integral with the flat sections, for storing and transporting food, water and vital supplies to remote regions without sophisticated food and water supply utilities.

It is also an object of the present invention to provide a collapsible, foldable cargo carrying collapsible, reusable push/pull cart which can be identified to hold cargo of one specific customer, and which can be manually rolled out of a transport vehicle with other cargo carrying collapsible, reusable push/pull carts associated with the customer, thereby obviating the need for weighty cargo stacking pallets and burdensome heavy machinery needed to unload cargo from the pallets.

Other objects will become apparent from the following description of the present invention.

SUMMARY OF THE INVENTION

The present invention includes several common features used to create collapsible reusable carrying cases in sizes varying from small food containers to large push cart bins on circular rotating transporters, such as casters or wheels. If one is introduced to any one of the sizes of containers or cases of this invention, it would be intuitive to assemble or disassemble any case of another size in the same general fashion, going from a joined flat space-saving configuration to a functioning case and vice-versa.

Although several different embodiments are included in this invention, all of the collapsible reusable carrying cases share these common attributes. All parts that make up a carrying case do not separate from the carrying case. No parts can be removed. Rigid plastic panels are used for constructing the cases; these may vary from synthetic materials, such as polyvinyl chloride to polypropylene or other such thermoplastic resins. No tools are required for assembly or disassembly. The sides of the cases are erected progressively by hand by interlocking elements at the corners. The panels also disassemble progressively by manually pulling apart. When folded into a flat storage or shipping configuration, the panels stay together, resisting unfolding by virtue of snaps which are either molded into the panels or bonded to them. Because of the carrying case material and the way it is constructed, it is resistant to water, dirt, bacteria, molds, allergens, and inclement weather. This extends the life of the product and insures that it can be reused over and over again for a number of years.

The carrying cases of this invention offer low first cost relative to their durability as compared with other alternatives. For example, cardboard cartons may be less expensive but their durability is lacking, while plastic cases as in the prior art often require heavy panels and metal hinges and latches. For businesses that use multiple carrying cases to ship their products, these carrying cases can be labeled with a specific digital bar code to identify the owner. Depending on the size, the customer can mail the carrying case back to the company (perhaps free of charge) after the customer takes his product out of the carrying case. He or she would then be credited for sending it back. Alternatively, he or she can take the empty case back to the store of purchase and get a refund of their deposit. Because these cases do not need to be recycled (like cardboard boxes), they are a Green Friendly Product. After a case of this invention has deteriorated from normal wear and tear after many use cycles, it can be sent back to the manufacturer and refurbished by spraying a coat of the material from which it was made. Plastic or fabric tape can be used to reinforce or rejuvenate fold lines. This process rejuvenates the case to its original serviceable form adding years of service life.

Depending on size, the method of choice to construct these cases is of molded panels with integral fittings or of corrugated plastic panels (such as polypropylene) with features such as edge fittings bonded to the panels. Folding of molded panels is achieved by incorporating living hinges in the mold at the fold lines. Corrugated polypropylene can be folded using methods long used for cardboard boxes, namely creating fold lines by pressing a tool edge in the desired location; the corrugations are crushed forming a fold line if the line is orthogonal to the corrugations while one or two corrugations are flattened if the line is along the direction of the corrugations.

The edges of these cases are assembled progressively from base to top edge by engaging nibs which protrude at right angles to each panel on the inside at each corner. The engagement is reminiscent of the co-planar engagement elements of an ordinary zipper; however, these nibs engage at right angles (orthogonal to each other); they are of a different shape and resilient material, and the engagement is manually accomplished without the use of a metal guide. The corners are separated to collapse the container by just pulling apart a corner progressively from top edge to bottom by hand. For all except the smallest containers, an inverted U-shaped captive metal locking pin is used to lock the side panels at the top edges at each corner; these are simply engaged or disengaged by the "lift and rotate method" to resist pulling apart. Again depending on size of a case and material being carried, further corner reinforcement is achieved by using one or more short Velcro straps attached to side panels on the outside of the corner. If deemed necessary by application, further side panel reinforcement is achieved by incorporating a stiff rod (such as a ⅛" diameter steel rod) at each top edge to strengthen the side panels. Multiple carry cases can be stacked on top of one another when assembled and in use. Collapsed carry cases with panels snapped together can be stacked horizontally or stored vertically. Carry cases can have rectangular side panels which result in straight vertical sides when assembled, or the side panels can be trapezoidal which results in inwardly sloped sides for more ease in filling or emptying cases with contents. The latter also nest compactly when empty.

The first embodiment is a tote box with hand-hold cutouts on two opposing sides. It is optionally fitted with an attached cover which is hinged (at a fold line) to the top edge of one of the sides. This embodiment can be made in a wide variety of sizes with or without hand holes and covers.

A second embodiment which is air and water tight is preferably made in small sizes (as for storage of food items) using molded transparent plastic panels. A resilient seal is bonded to one of each pairs of mating side edges adjacent to a row of engagement nibs. When assembled, the engaged nibs of the second side compress the resilient seal rendering the edge sealed. The nib profile is such that it biases the corner to pull the sides together when the nibs are engaged. The seal does not alter the method of assembly or disassembly. A cover is attached to one side at the top edge at a fold which acts as a hinge (as in the first embodiment). The cover has an inner linear seal along the three cover edges adjacent to the overhanging lip but a short distance away leaving a groove which engages and compresses the seal against the inner surface of the top edges of the three sides thereby sealing the cover to the sides when pressed down. In a further embodiment, there is no fold-hinged top. Instead, a molded top cover of more resilient plastic with a continuous integral seal on all four edges is used; this could be made of a variety of thermoplastic elastomers or even silicone. This cover is sized such that the seal engages the top edges of all four sides; the seal is effected by pressing down whereby both the inner and outer container side surfaces are captured in the groove of the integral seal. Since this molded cover is separate, it is attached to the back side of the container loosely at the top edge by a strip of elastomeric tape so as not to interfere with the proper alignment and engagement or disengagement of the cover.

The next embodiment is a push/pull cart which can be of substantial dimensions (such as a tub 3' high, 3.5' long and 3' wide) with an integral bottom steel frame and four double circular rotating transporters, such as casters or wheels for easier maneuverability. This push cart has a cover hinged at a fold line with four cut-outs to accommodate the circular rotating transporters, such as casters or wheels of a cart stacked above (whether assembled or flattened). The cutouts prevent the circular rotating transporters, such as casters or wheels from causing a stack of push carts from sliding off one another. Using a particular sequence of folding and snapping the panels together when collapsing a tub, the push cart is transformed into a compact flat shape attached to the bottom frame. In yet another embodiment, the push cart is fitted with a fail-safe central-locking brake system. The brake is engaged by a foot pedal which is pushed down into a latched position providing both auditory (a click) and tactile (through the foot) feedback of having achieved the locked state. The brake is disengaged by a brake release pedal which unlatches the brake pedal whereby it rises. The brake pedal engages four separate brake elements on all four double circular rotating transporters, such as casters or wheels which keeps each circular rotating transporters, such as casters or wheel, from rotating or swiveling.

In an alternate embodiment the push cart is height adjustable by means of a plurality of fold lines which separate respective side panels and the cover panel into respective half panels.

In a preferred embodiment, a food, water and vital supplies storage and transport cart is configured to perform two distinct functions. The different features to the carts will be obvious for their intended functions.

A first function of the cart is to store, transport, and dispense water and/or other liquids, preferably up to approximately 30 gallons of water, especially where no public water supply is available, or is temporarily unavailable because of weather disasters, such as hurricanes, typhoons, tsunamis or earthquakes. This cart has substantially the same basic features as the collapsible, reusable, carrying case push pull cart noted above, but the added strength and waterproof features clearly distinguish its use to transport, store, and disburse water and other vital supplies to remote geographic locations. Its corner sides connect and pull apart by using molded J-channels or U-channels on the edges. The J-channels or U-channels provide a good seal for water tightness. They are preferably made of springy vinyl plastics that grip the male edge portions of adjacent panels tightly in a water tight seal. While other vinyl plastics can be used, preferably the U-channels and panels are made of thermoplastic polyethylene (i.e. UHMW ultra high molecular weight polyethylene or PVC (polyvinyl chloride). The UHMW plastics have long chains, with molecular mass of about 3.5 to 7.5 million amu. UHMW polyethylene (and other polyolefins) are good for water tightness, because they do not absorb water readily. Typical watertight panels include those sold under the brand name COROPLAST®. Optionally the male edges of adjacent panels insertable within the J-channels or U-channels can be coated with elastomeric silicone seals to improve water tightness. The plastic material used is also biocompatible and is made to store food and water. This cart that is being used to transport and dispense water includes a push button spout on one lower side of cart to dispense the supply of water. The push button and spout area is preferably about 1 and one half inch lower than the rest of the bottom floor of the cart and is preferably about 3 inches in diameter, with output pipes of between about ½ to 1½ inches in diameter. The cart has thermal protection to it, such as foam included or gel walls, keeping its contents either hot or cold longer than most transport equipment. The cart is constructed to hold approximately 300 lbs. of water (35 gallons), preferably up to 400 pounds of water (48 gallons) as well as being water tight. The contour of the bottom of the cart is pitched downward toward the spout, so water can empty into the spout when a rubber or other release button is pushed in, which pushing lifts the plug up (covering the hole) in bottom of cart for water to drain out from. Both ends of the plug and button are attached as one solid piece. Pushing one end in (with the rubber button provided on the outside) lifts the plug on the inside of cart. The spout on the bottom of the cart where the water comes out of will, has a standard size diameter of a garden hose fitting which can be easily attached to the spout. Both the push button on the outside, and the outside pour area of the spout, have threads on them to screw on a protective cap so as not to engage the rubber button or spout. The protective caps could be made of hard rubber/plastic which will only unscrew if first pushed in and held in before the threads start to unwind the cap. This is a safety feature so water isn't dispersed unintentionally. Other water tight panel connections known to those skilled in the art of water transport can also be used.

A second distinguishable feature to this cart is there is provided a second welded hook (hitch) to the opposite end of the cart chassis to hook up the cart from either end with a hitch to pull it. The push button and spout are located on the opposite side of the cart from the brake pedals. Just below that hook is provided the push button and underneath that is the spout. On the opposite brake pedal side of the cart is located the additional hook (hitch).

The four wheels to this cart are required to be bigger and stronger, approximately the size of the wheels used on hospital gurneys, such as, for example, four to six inches in diameter, so that they are able to be used on uneven dirt roads and rock surfaces in remote geographical regions where no public water supply is available, or is temporarily unavailable because of weather disasters, such as hurricanes, typhoons, tsunamis or earthquakes. The wheel wells on the top covers of these carts are reinforced with thicker plastic mold to hold the 300 to 400 lbs. of weight. These carts, when filled with water or other supplies, can be pushed up a portable ramp onto either a table or on top of another cart, and then stabilized by putting the brake pedal on (which makes the cart stationary). When stabilized in place, the user goes to the opposite end of the cart and unscrews both safety caps (on the push button and on the spout) and dispenses water by pushing in the rubber or other elastomeric push button, to open the spout for dispensing water or other liquid therethrough.

This innovative cart to transport, store, and disperse water is be very valuable to smallholder farmers, or other rural areas, especially living in third world countries where water is a vital essential to their living, where these areas are without modern day plumbing or irrigation systems for their fainting. These carts can easily transport water from their water source (rivers, lakes) and either can be pushed or pulled with a bicycle, moped or motor bike back to a farm or village in need of water, where no public water supply is available, or is temporarily unavailable because of weather disasters, such as hurricanes, typhoons, tsunamis or earthquakes. These types of bicycles are an important tool to use especially if the roads are not accessible to motor vehicles. This is a very common occurrence from natural disasters, such as drought or severe storms, or acts of war. In certain emergency situations these carts can be filled with water, wrapped, with certain coverings and parachuted out of planes to certain target areas where much needed relief is necessary.

The carts are beneficial to a lot of places in the world, today where the people still have to walk miles carrying maybe one gallon of water at a time back to their village habitat. The carts can also be utilized, in remote recreational camping areas without public water supplies.

These push/pull carts can also be used to transport large amounts of water on trucks or small commercial vehicles (vans, pickup trucks).

The water supply carts can also be stacked on top of one another, acting as space savers. These carts can be identified and tracked by bar-coding, indicating its owner and either transport the owner's product, whether the water cart is or leased to companies to use as a means of transporting their products.

These water carrying carts also collapse down (folded) when not in use, stack on top of one another made into an easy space saver (and can easily store in a trunk of a car). The carts can be easily transported to an area where the carts will be used over and over again. These carts are made to last for a number of years, and life expectancy calculated and estimated after testing in the simulated and/or real time use environments.

Two other vital uses for this cart are to transport food (harvested crops from smallholder farmers) to market or to transport vital emergency supplies (medical supplies) to disaster areas. The watertight construction and thermal protection of these carts keep the contents safe and dry.

Currently, smallholder farmers lose up to one third of their harvested crop from spoilage, because they do not have the right transport container to get their product to market before spoiling. These thermally protected carts help solve the farmer's problem of spoilage. Obviously the spouts on these carts are made to use for water. The cart that is used for food or emergency supplies do not need a spout, plus the bottom of the cart does not need to be pitched for water flow, but it may be optionally provided with a drain hole at the bottom of the cart, in case of moisture inside the cart when transporting food or medical supplies instead of water.

Another use for the carts is to supply water for toilets where no public water supply is available, or is temporarily unavailable because of weather disasters, such as hurricanes, typhoons, tsunamis or earthquakes.

In an alternate embodiment, a collapsible, foldable cargo carrying reusable push/pull cart is identified with text or bar-coded indicia that the cargo carrying collapsible, reusable push/pull cart holds cargo of one specific customer. Multiple cargo carrying collapsible, reusable push/pull carts can be organized within a truck transport trailer, and multiple cargo carrying collapsible, reusable push/pull carts identified with a single drop-off customer can be manually rolled out of a transport vehicle, with other cargo carrying collapsible, reusable push/pull carts associated with the customer, thereby obviating the need for weighty cargo stacking pallets and burdensome heavy machinery needed to unload cargo from the pallets.

BRIEF DESCRIPTION OF THE DRAWINGS

The present invention can best be understood in connection with the accompanying drawings. It is noted that the invention is not limited to the precise embodiments shown in drawings, in which:

FIGS. 12A-12D illustrate the four steps required to fold the push-pull cart to a compact configuration shown in FIG. 12E.

FIG. 13A shows the metal subframe with braking components attached. FIG. 13B is a side detail of the brake pedal subassembly. FIG. 13C is a side view of a ring brake element, while FIG. 13D is a top view.

FIG. 18A shows the metal subframe with braking components attached, FIG. 18B is a side detail of the brake pedal subassembly. FIG. 18C is a side view of a ring brake element, while FIG. 18D is a top plan view thereof.

FIGS. 19, 20 and 21 depict an alternate embodiment for stackable cargo carrying container carts in general (preferably without a water spout), where the carts are stacked in a delivery truck as shown for smoother delivery to customers, and wherein:

FIG. 19 is a perspective view of a collapsible cargo carrying collapsible, reusable push/pull cart.

FIG. 20 is a perspective view in partial crossection, showing multiple related cargo carrying collapsible, reusable push/pull carts stacked within an interior of a trailer of a transport truck, and, FIG. 21 is a side elevation view in partial crossection of an array of multiple sets of cargo carrying carts stacked by customer destination, and showing a set of cargo carrying carts being manually unloaded on an exit ramp, without the use of weighty storage transport pallets and without the need for heavy machinery to move the stacked cargo carrying collapsible, reusable push/pull carts.

DETAILED DESCRIPTION OF THE DRAWINGS

Figure 1:
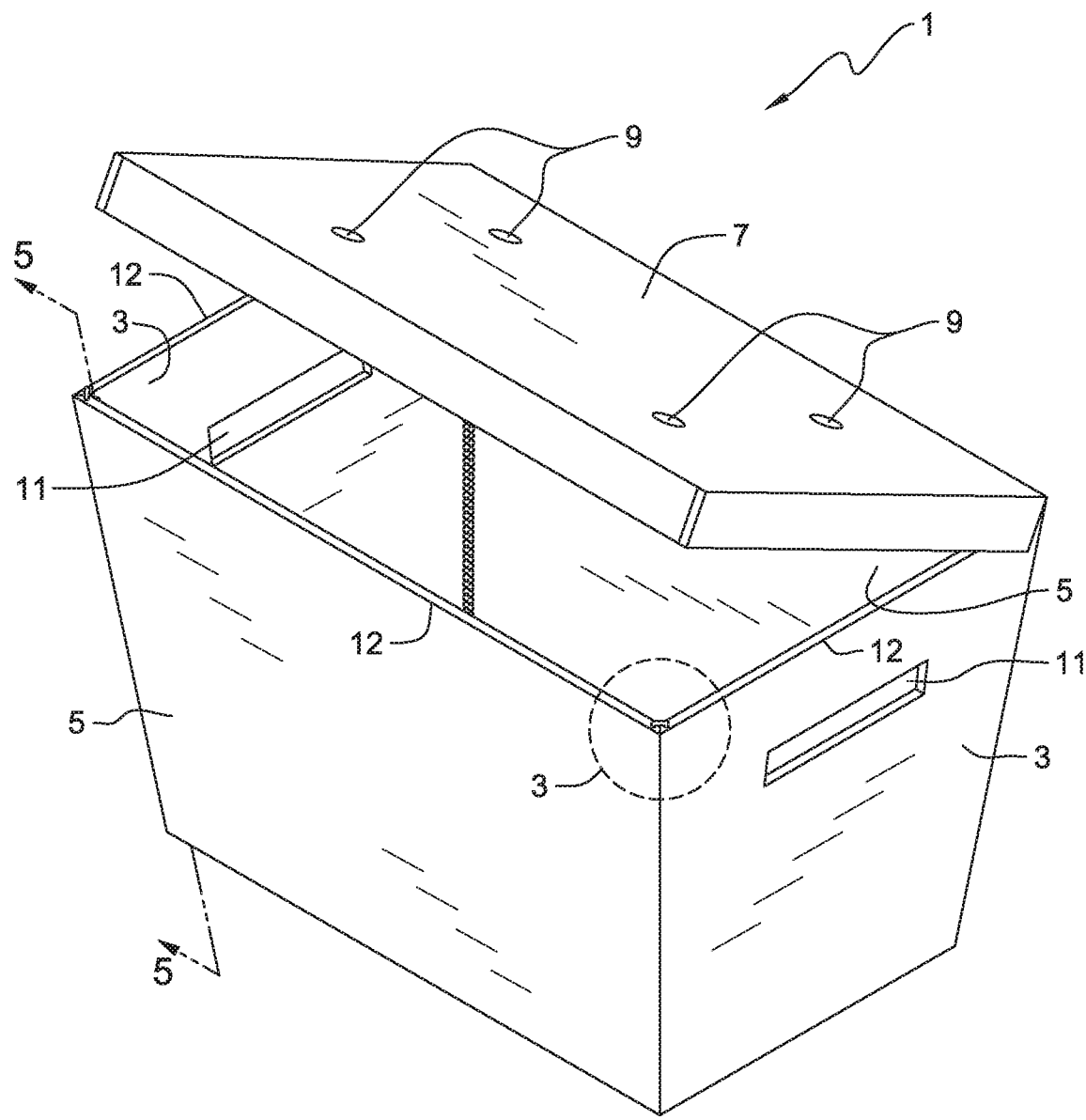
FIG. 1 is a perspective view of an assembled collapsible tote box constructed in the manner of this invention.

FIG. 1 shows a collapsible tote box 1 with cover 7 and hand holes 11 in opposite end panels 3. A bottom 17 (shown in FIG. 2) and two side panels 5 complete the carrying case in the form of this tote box 1. Optional reinforcement rods can be attached (or molded over) at top edges 12. Indentations 9 on the top of cover 7 are in registration with molded feet on the bottom (not shown) to permit stacking of assembled tote boxes 1 while resisting sliding sideways.

Figure 2:
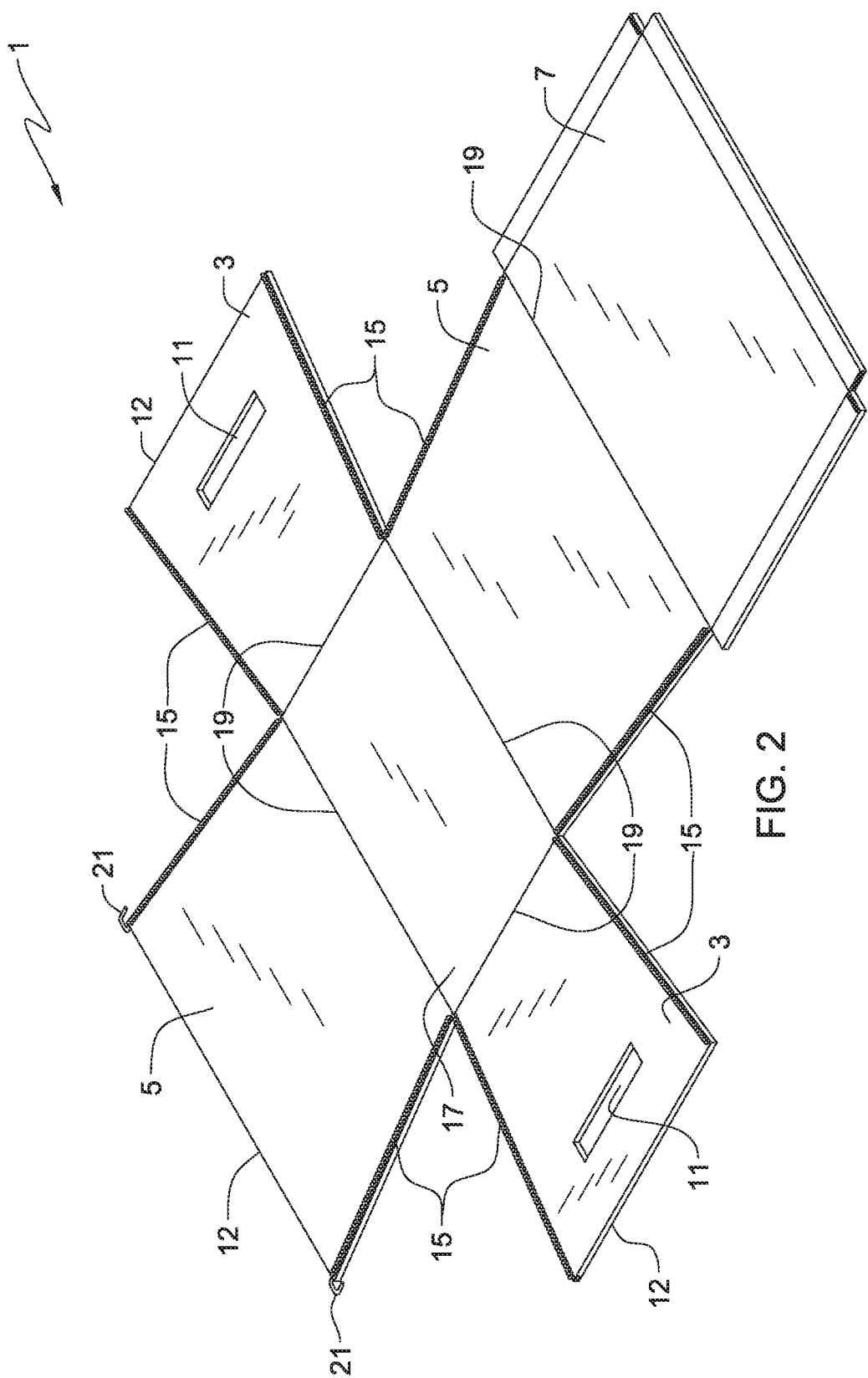
FIG. 2 is a perspective view of the tote box of FIG. 1 with all panels flattened to a collapsed configuration.

FIG. 2 shows a collapsed view of tote box 1 showing the location of rows of assembly nibs 15 at adjacent panels. Lines 19 denote fold lines which may be living hinges if box 1 is molded or actual folds if corrugated plastic panels are used.

Figure 3:
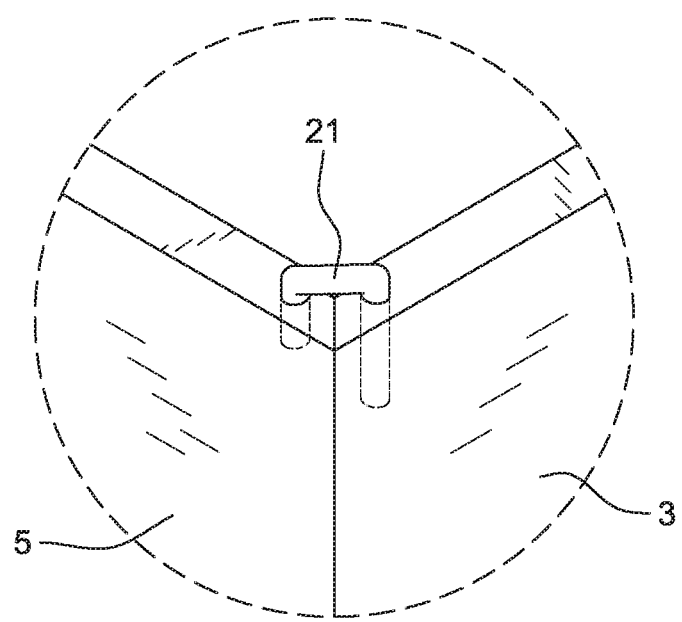
FIG. 3 is a close-up perspective detail of a corner reinforcing (inverted U) locking pin with one captive leg which keeps it attached to the collapsible container.

FIG. 3 shows a captive inverted U-pin 21 used to reinforce the corner at the top. The longer leg is captive (not detachable) but permits lifting of pin 21 out of contact with adjacent panel 3 or 5 and also permits rotation for disassembly and assembly.

Figure 4:
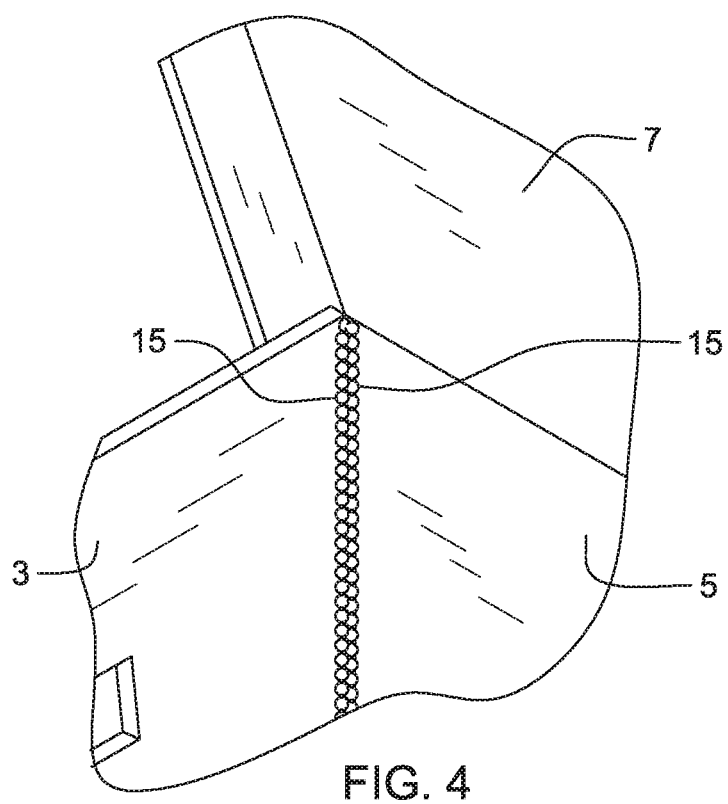
FIG. 4 is a close-up perspective detail of an inside corner of the tote box of FIG. 1 showing one embodiment for closure of joints, such as the engagement of a line of nibs protruding at right angles horn the surfaces of adjacent sides.

FIG. 4 is a detail showing the engagement of the rows of nibs 15 attached to adjacent panels; these are used to progressively assemble and disassemble tote box 1.

Figure 5:
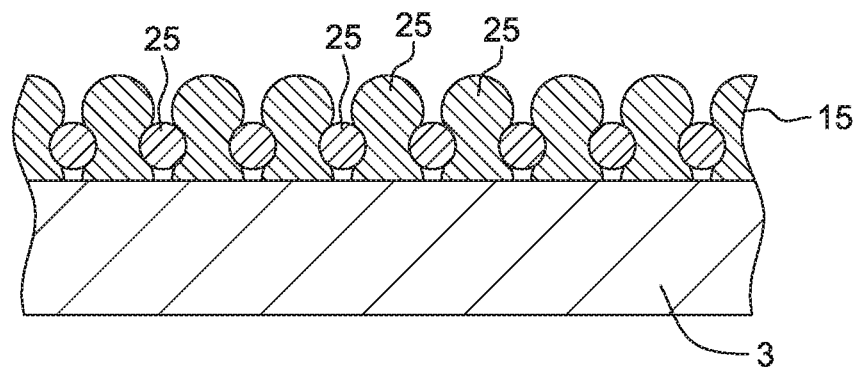
FIG. 5 is an enlarged side crossectional view of an edge joint showing the fit of nibs of FIG. 4 with their profile clearly outlined.

FIG. 5 shows a crosssection detail of the two rows 15 of adjacent orthogonal nibs 25 as engaged. The profile of each nib 25 is shown with dome section at distal end, smaller neck, and wider base attached to box panel 3. These nibs 25, in most cases, would be molded separately in strips 15 which are then attached along the edges of the box. This permits them to be molded of a flexible material, such as a thermoplastic elastomer (TPE) or silicone which is more flexible than the material of the tote box, a more rigid resin such as polypropylene, polycarbonate, PVC, etc. It is noted that the engagement at the neck of each nib 25 causes the nibs to actually pull the panels together at the corners.

Figure 6:
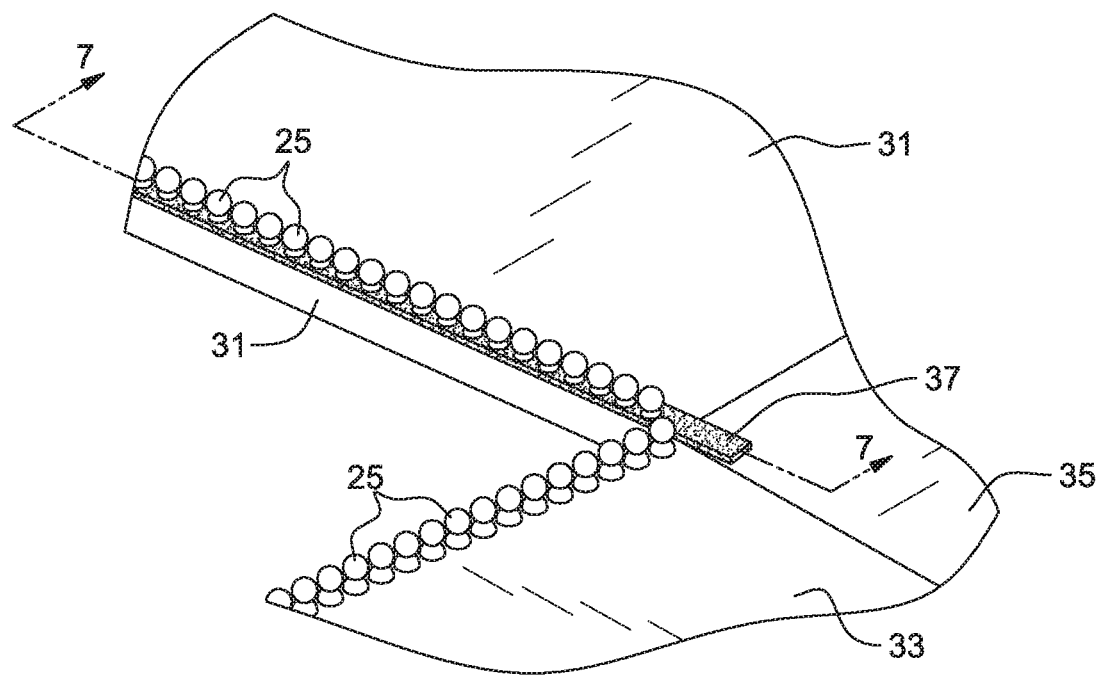
FIG. 6 is a perspective detail of adjacent edges of sides of a carrying case when in a flat collapsed configuration showing the addition of a linear seal to seal the corner when assembled.
Figure 7:
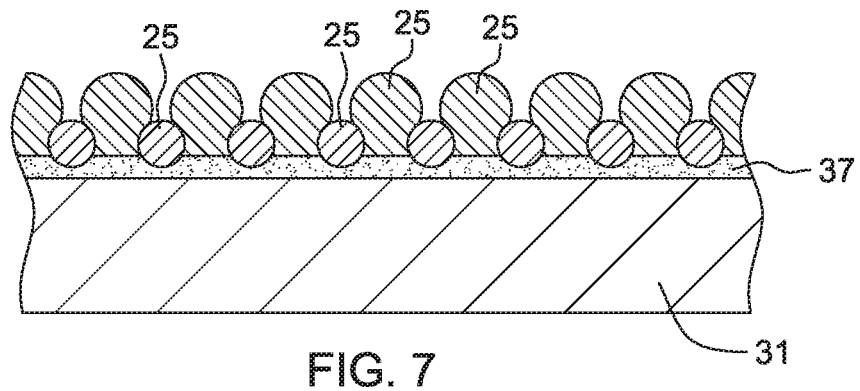
FIG. 7 is an enlarged side crossectional detail (as in FIG. 5) with the addition of the linear seal of FIG. 6 showing the seal sealing the crossed engaged rows of nibs.

In an alternate embodiment of FIGS. 6 and 7, the carrying cases are required to be air and water-tight. The linear seal or gasket 37 shown added around the base of a line of nibs 25 of one of a pair of adjacent nib lines in FIG. 6 before assembly will seal that edge after assembly of sides 31 and 33 as they are progressively interlocked from bottom panel 35. FIG. 7 is a crossectional view showing crossed engaged nibs 25 deforming linear seal 37 locally to effect the seal.

Figure 8A:
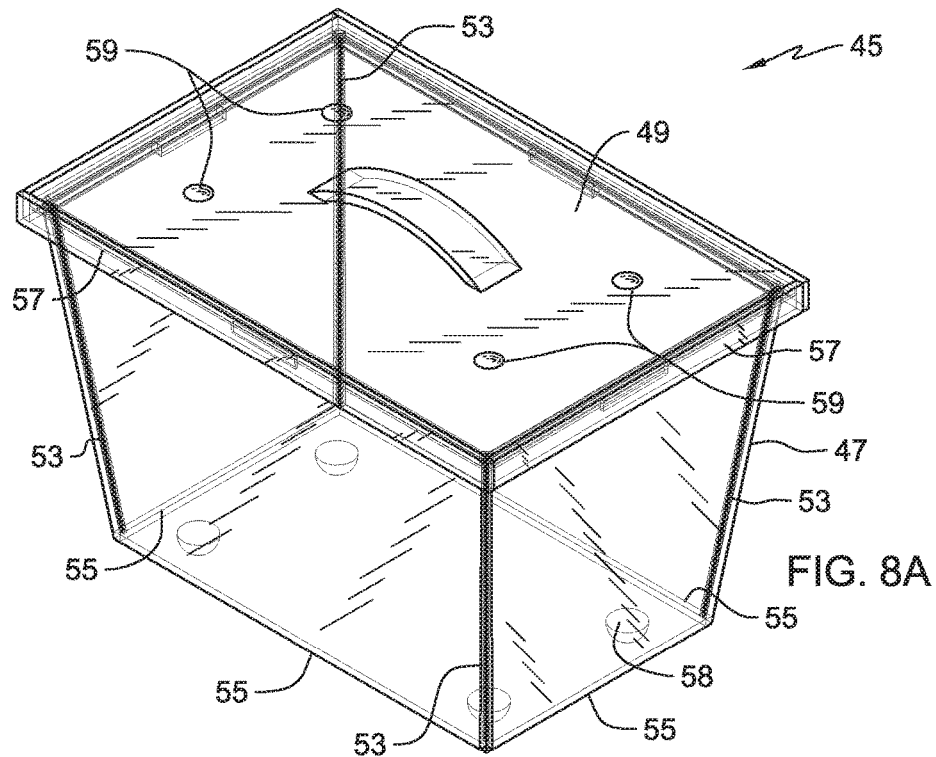
FIGS. 8A, 8B, and 8C show three views of a transparent air and water-tight food container built according to this invention; 8A is a perspective view with the lid closed, 8B is a perspective view with the lid open showing the four-sided gasket, and 8C is a side elevation showing the elastomeric cover hinge.
Figure 8B:
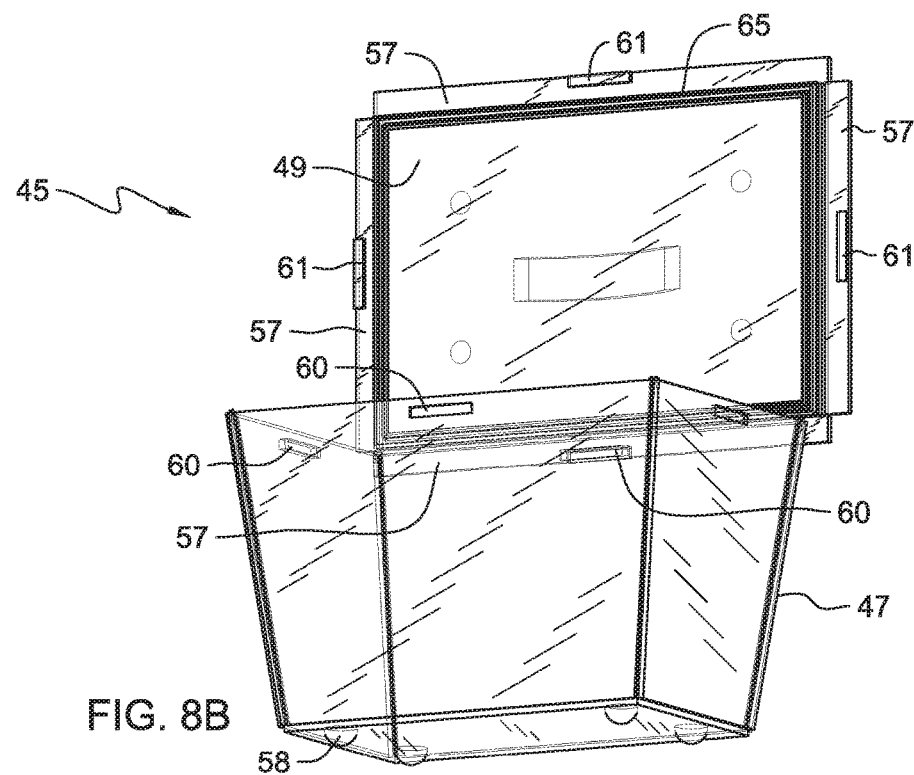
Figure 8C:
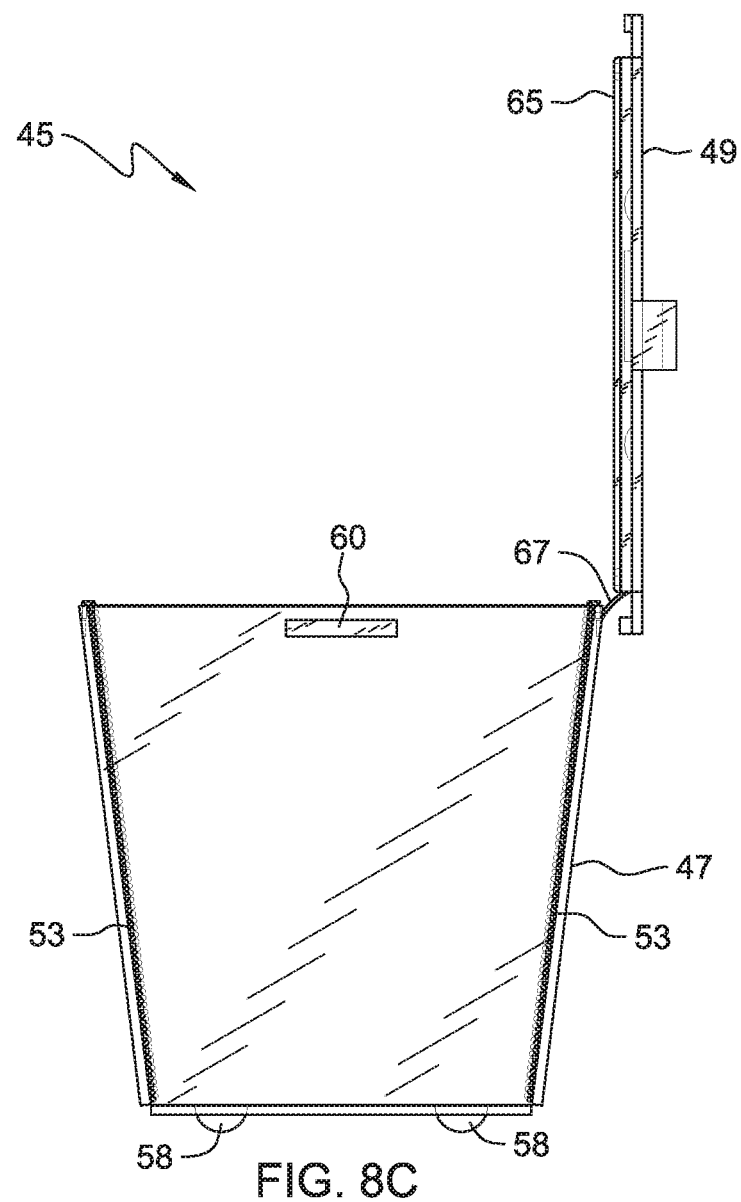

A small collapsible water tight food container 45 is shown in FIGS. 8A-8C. It is made of transparent panels with a transparent cover 49 both for aesthetics as well as utility to be able to view and identify the contents. To insure air and water-tightness, edges 53 are assembled from sealed nib lines as shows in FIGS. 6 and 7. Fold lines 55 are molded living hinges. Cover 49 is made of a transparent TPE or silicone with integrally molded gasket 65 along all four edges capturing and sealing the top edge of all four rigid side panels. For extra sealing insurance, extra sealing can be added inside cover 49 at the corners. Flaps 57 around all four edges of cover 49 have male protrusions 61 which fit into and lock within molded recesses 60 molded into the sides in registration. These locks keep cover 49, seal 65 and the top edges of container part 47 in intimate contact. Elastomeric hinge 67 (see FIG. 8C) attaches cover 49 to container 47 in such a manner so as not to interfere with the proper alignment, engagement or disengagement of cover 49 which must be pressed down vertically. Recesses 59 in cover 49 are in registration with molded feet 58 to prevent stacked containers 45 from sliding off each other.

Figure 9:
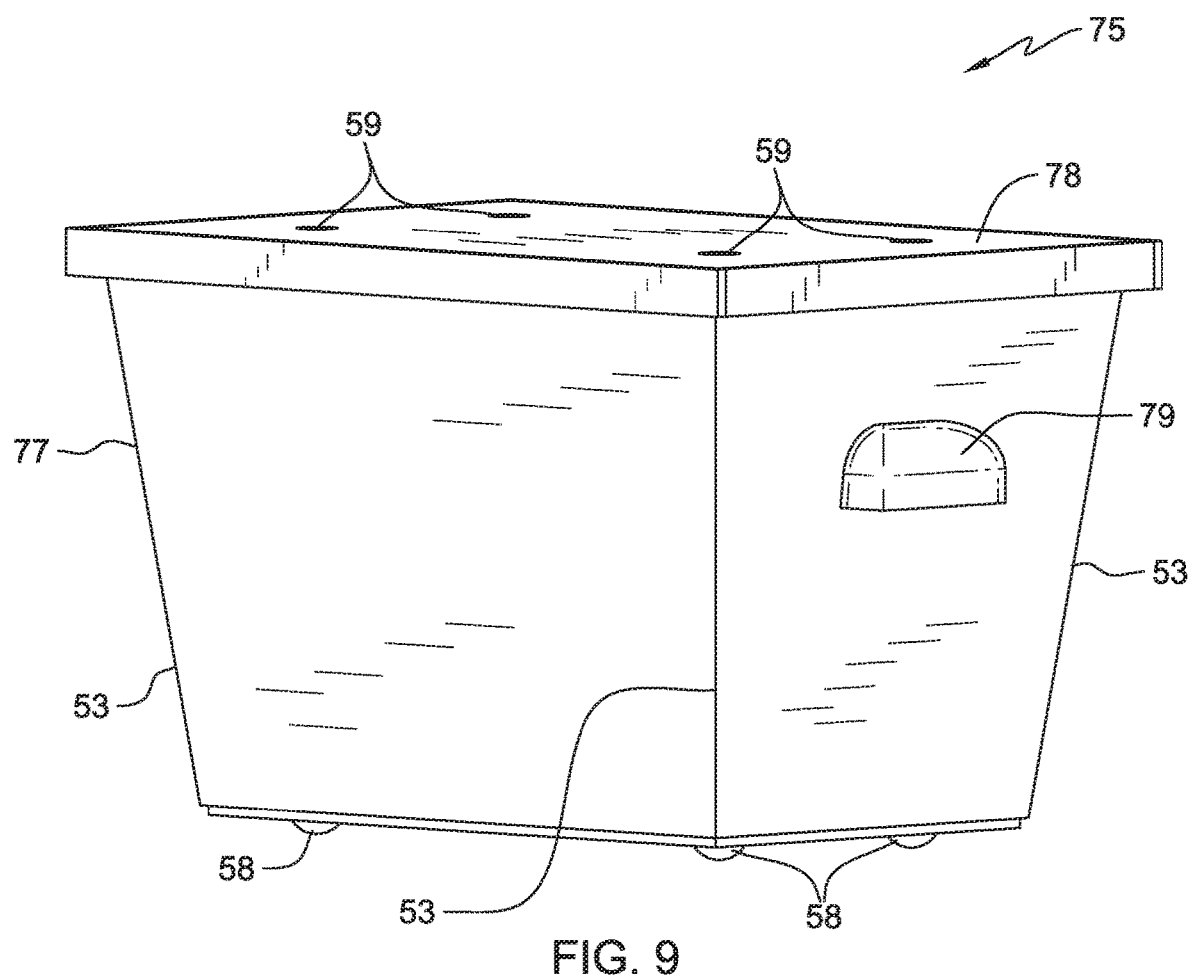
FIG. 9 is a perspective view of a collapsible produce carrying case of larger dimensions than that of FIG. 8 with external handles, but which shares the air and water-tight sealing of the smaller containers.

FIG. 9 shows a larger collapsible produce carrying case or tote 75 with external handles 79. The construction is similar to that of food container 45 also being air and water-tight although not necessarily transparent. Cover 78 may be molded with integral seal, or a rigid cover with attached resilient seal within may be used to seal with the top edges of container 77.

Figure 10:
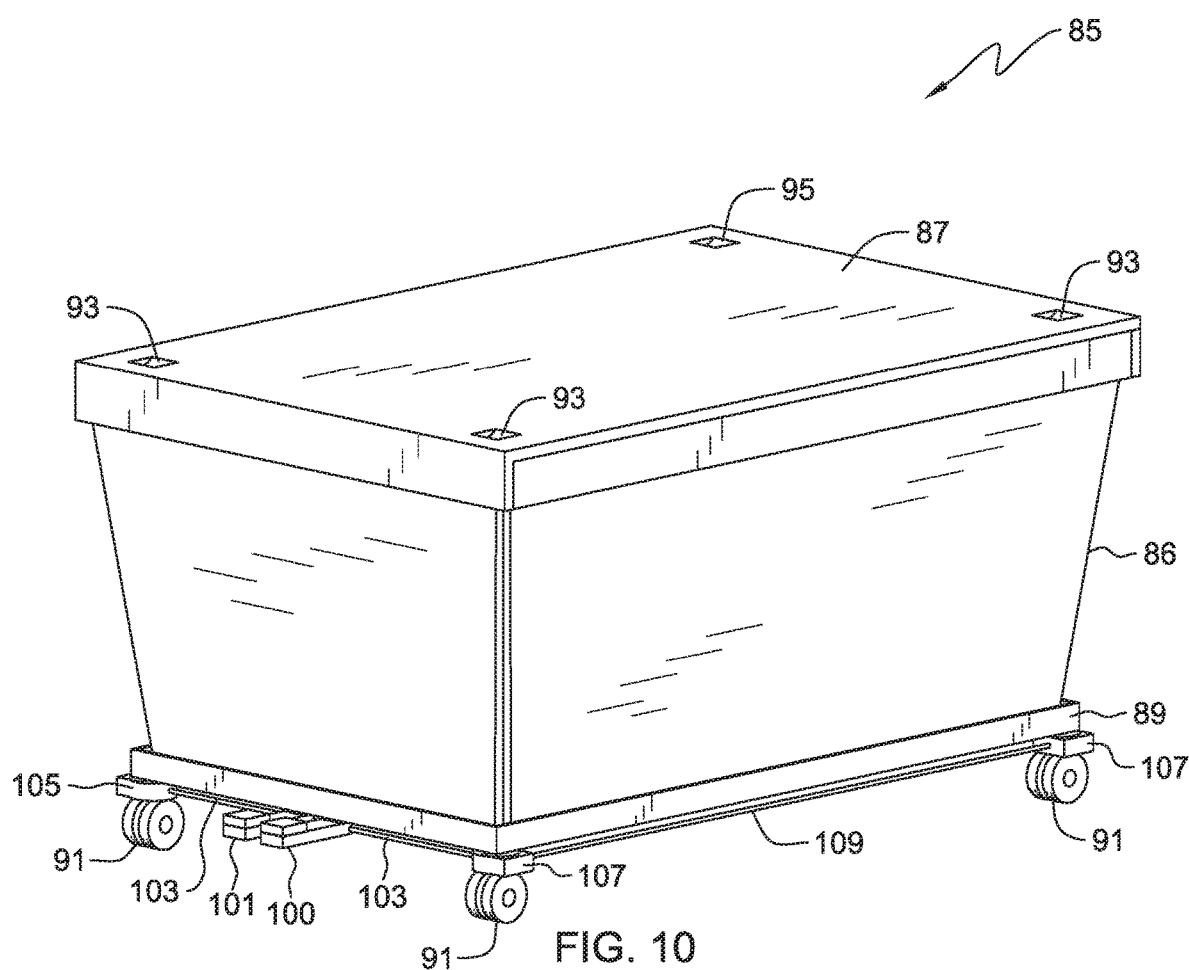
FIG. 10 is a perspective view of a push-pull cart attached to a bottom metal frame with circular rotating transporters, such as casters or wheels; it is constructed with rows of nibs on the edges and folding sides so it can be collapsed and then folded compactly atop the metal frame. It is shown with the optional central braking system.
Figure 11:
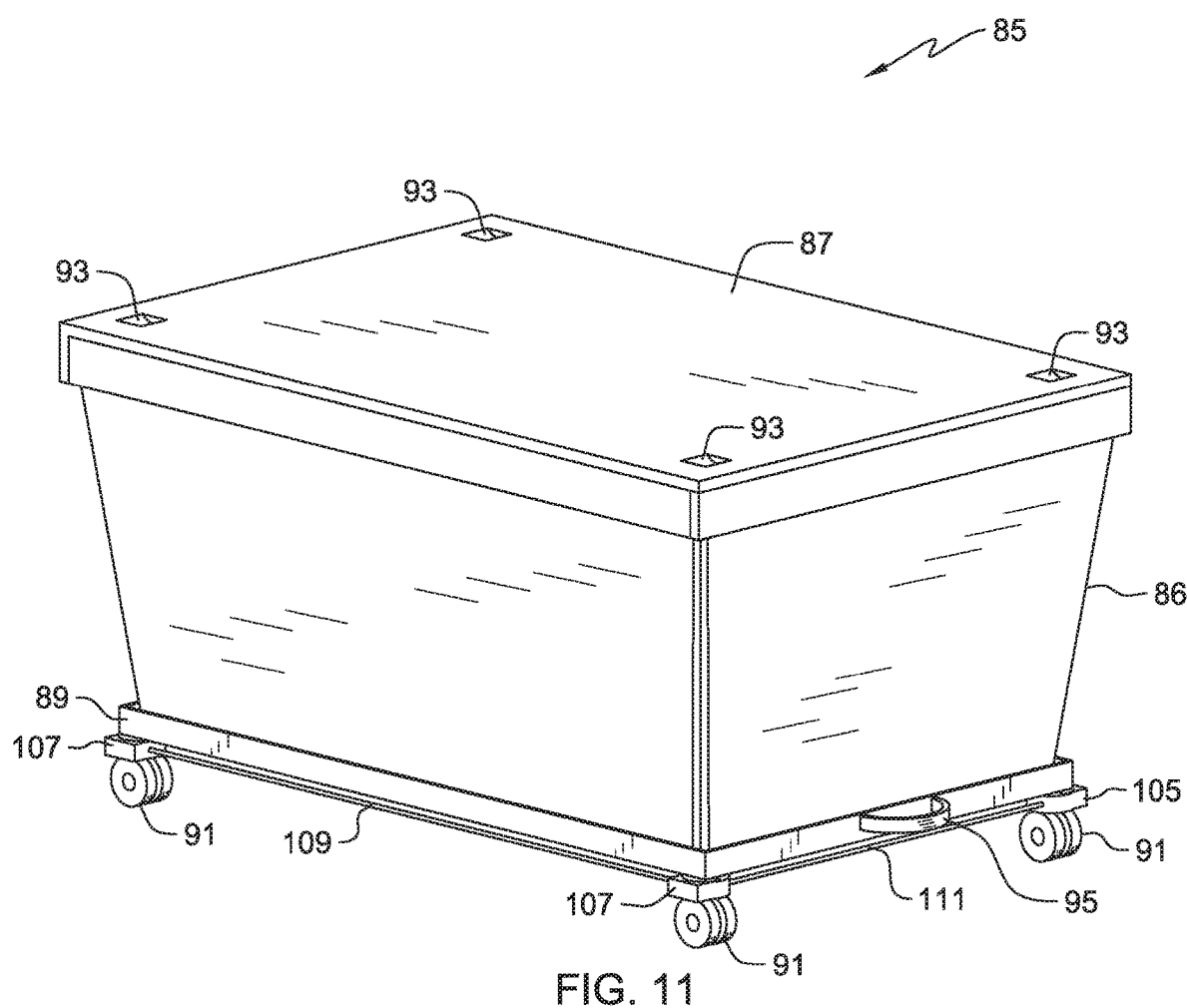
FIG. 11 is a perspective view of the push-pull cart of FIG. 10 showing the front end with tow loop.

FIG. 10 is a side and back view of the push-pull cart 85 of this invention. It is attached to a metal subframe 89 with four double circular rotating transporters, such as casters or wheels 91 for ease in moving in any direction with minimal resistance. Elements of the optional central braking system are shown and will be described later in more detail in FIGS. 13A-13D. Container section 86 is assembled as described in previous embodiments using strips of engagement nibs at all four upright edges. The bottom is attached to the metal frame in a permanent fashion. Cover 87, which is hinged at a fold line to the back side, has four recesses 93 on the top to accept four double circular rotating transporters, such as casters or wheels 91 of a push-pull cart which may be stacked atop in either the assembled or folded down configuration to prevent sliding off. FIG. 11 shows the front of cart 85 revealing tow loop 95.

Figure 12A:
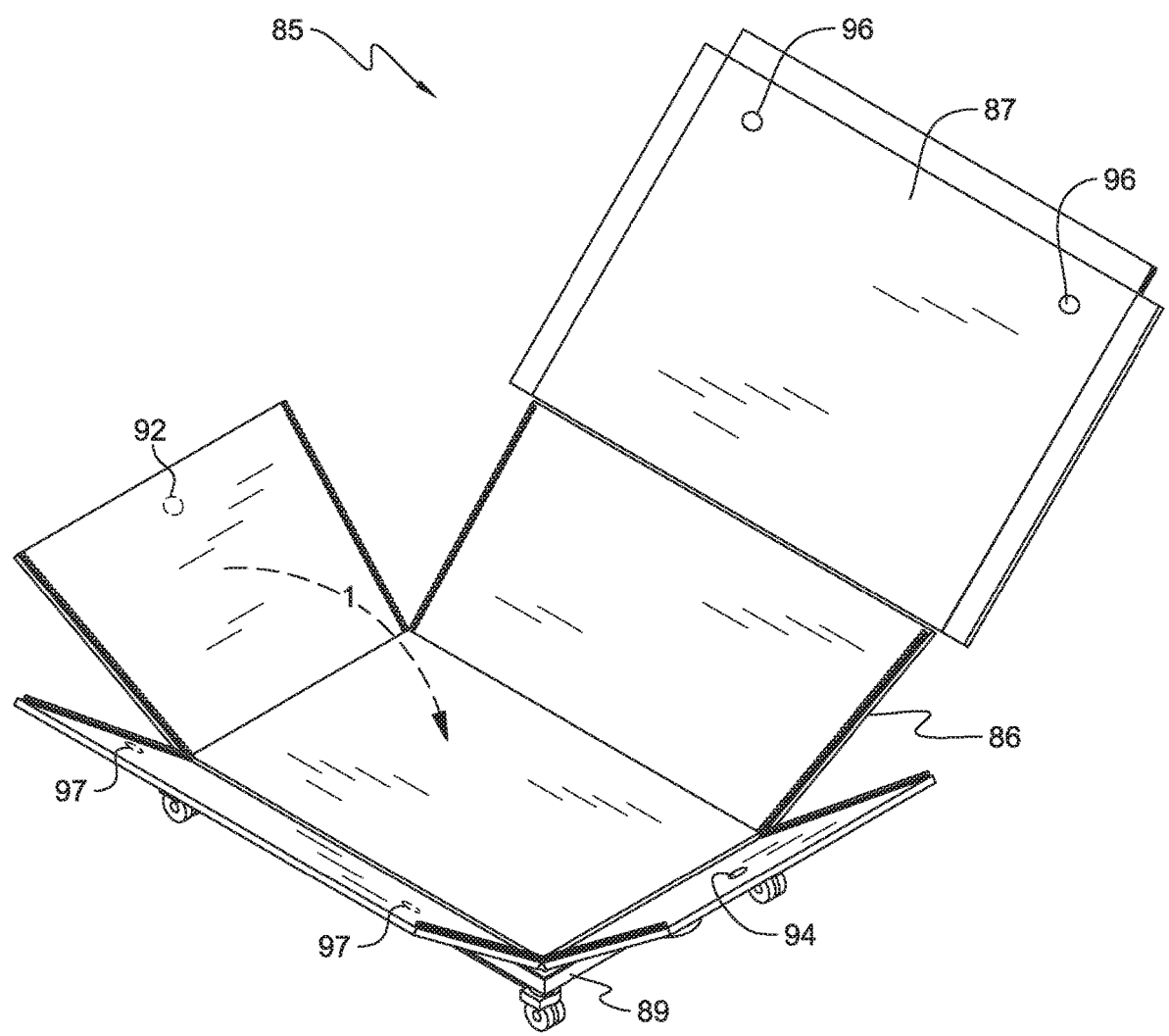
FIGS. 12A-12E show the steps involved in collapsing and then folding the push-pull cart of FIG. 10.
Figure 12B:
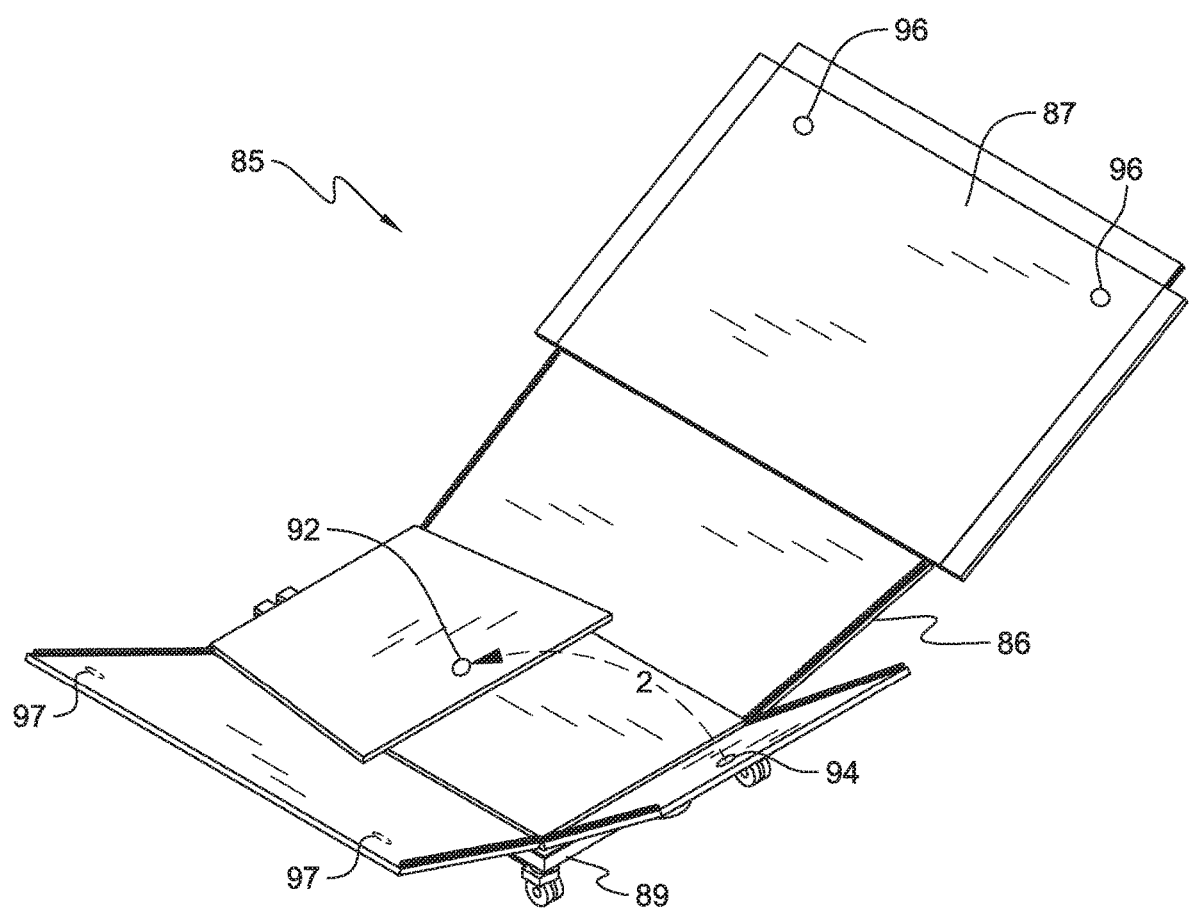
Figure 12C:
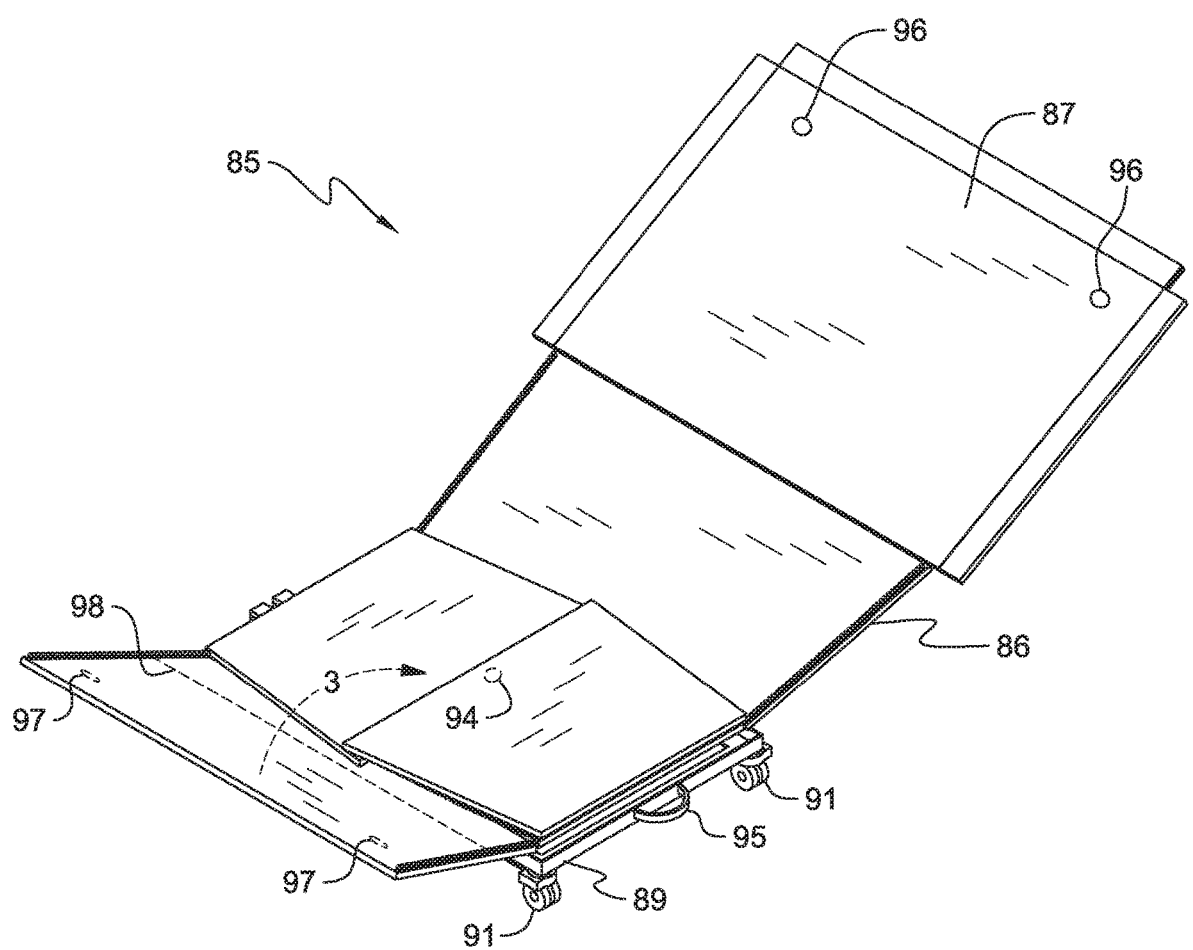
Figure 12D:
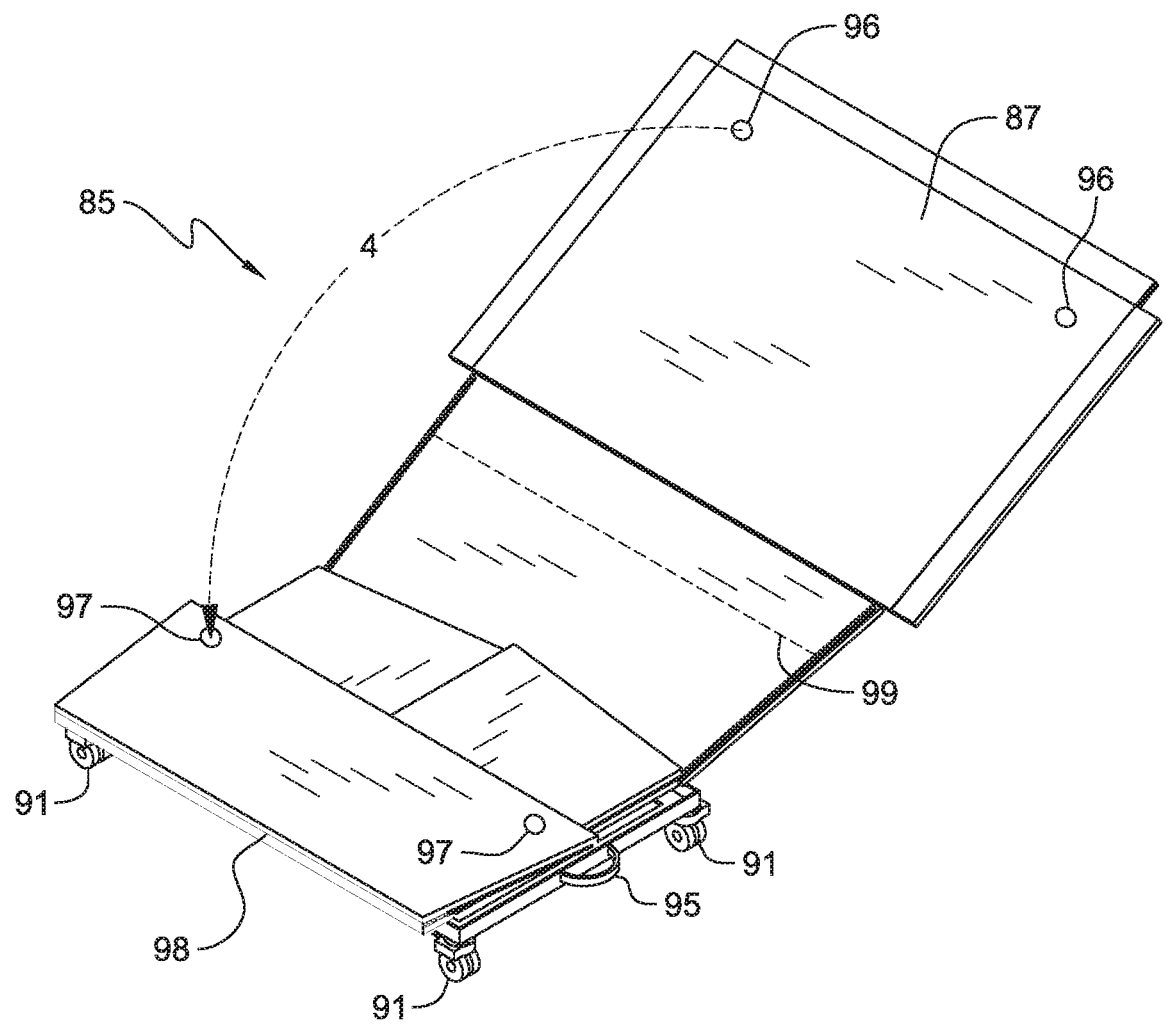
Figure 12E:
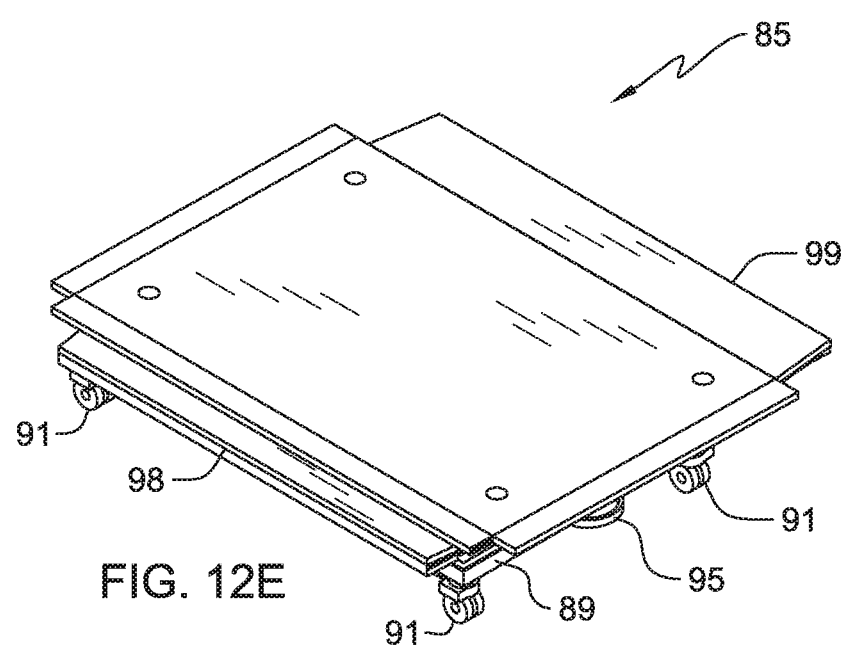

Push-pull cart 85 has side panels which cannot be folded backwards at the bottom hinge lines because of attached metal bottom frame 89. A four step folding procedure of the collapsed cart is shown in FIGS. 12A-12D. In step 1 of FIG. 12A one sees one end being folded inward toward, the bottom which will place outside surface snap 92 facing up. Also shown are mating snap 94 on the opposite end panel, and snaps 96 on the inside surface of cover 87 and mating snaps 97 on the outside of the opposite side panel. In step 2 of FIG. 12B the other end panel is folded inward and snapped into 92 via inside snap 94. In FIG. 12C a fold line 98, only used in the collapsed configuration, is revealed. In step 3 side panel is folded inward at 98 placing, outside snaps 97 face up. In FIG. 12D fold line 99 is revealed on the opposite side; it is only used in the collapsed configuration. In step 4 cover 87 with a portion of the attached side are folded inward at line 99 wherein inside snaps 96 are mated with snaps 97 thereby completing the fold sequence resulting in the compact snapped together configuration shown in FIG. 12E. In the folded embodiment shown in FIGS. 12D and 12E, further fold lines (not shown) can be provided so that all of the panels 87, etc., are folded within the confines of the perimeter of chassis frame 89 of cart 85, to prevent damage to panels 87 of adjacent carts 85 or other fixed objects.

Item numbers 100 and above are reserved for optional brake subsystem components. Some of these may be seen on FIGS. 10 and 11. Although many variations are possible, FIGS. 13A-13D show (in schematic fashion) one workable implementation. The braking system is engaged on all four double circular rotating transporters, such as casters or wheels simultaneously (components will also work on single circular rotating transporters, such as casters or wheels) by pressing down on a brake pedal until it is latched in the down position. This engagement prevents circular rotating transporters, such as casters or wheels from rotating or swiveling regardless of the direction they were pointing at the time. The brake is simultaneously released from all four double circular rotating transporters, such as casters or wheels by pressing the release pedal which releases the brake pedal latch permitting the return spring to lift up the brake pedal. The action is fail-safe in that a defective pedal return spring or gear or rod will not release the brake action once it is latched; this will prevent the push-pull cart from careening down a slope.

Figure 13A:
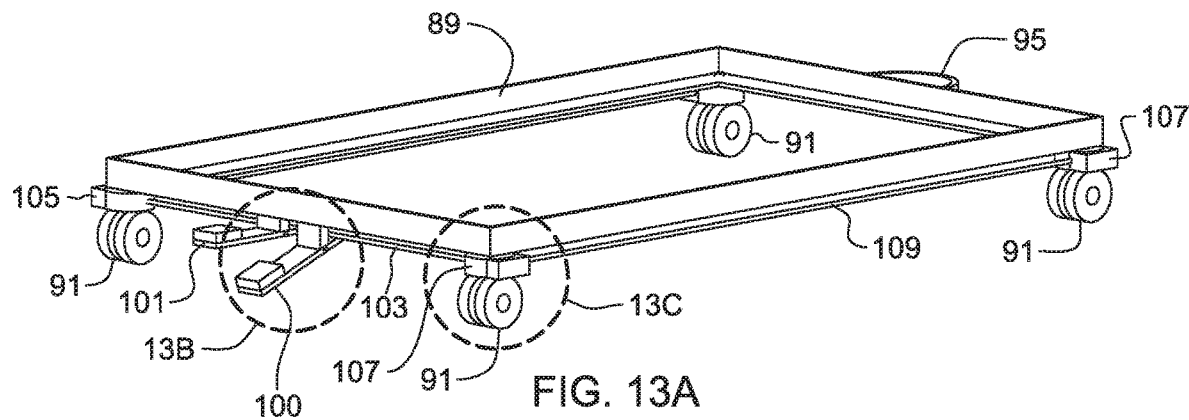
FIGS. 13A-13D pertain to the optional central braking system.
Figure 13B:
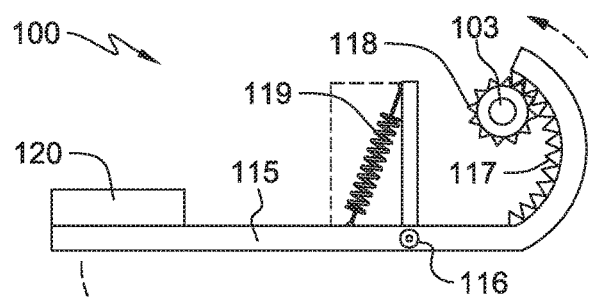
Figure 13C:
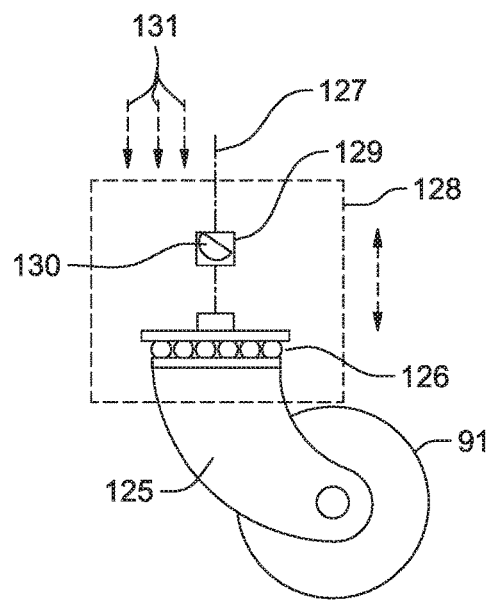
Figure 13D:
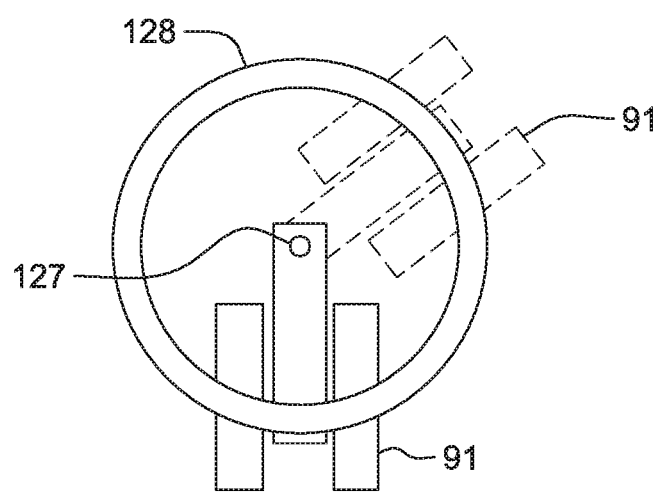

FIG. 13A shows bottom metal frame 89 detached from container section 86 for clarity. Brake pedal 100 and release pedal 101 are shown at the rear of cart 85; brake rod 103 goes from housing 107 to housing 105 through the brake pedal assembly gear 118 (shown in FIG. 13B). Housings 105 (also shown in FIGS. 10 and 11) contains a ring brake element as depicted in FIGS. 13C and 13D. Housings 107 as also shown on FIGS. 10 and 11 include ring brake elements as in 105, but they also have a pair of meshed bevel gears (preferably molded plastic) to extend the action of brake rod 103 synchronously to extension rod 109 and onward to front brake rod 111 (shown at the front in FIG. 11). FIG. 13B illustrates the side view of brake pedal assembly 100. Rigid chassis 115 is pivoted at 116 and pulled up to the "brake not applied" position by robust extension spring 119. The front of chassis 115 is configured as a sector of internal gear 117 which is meshed with pinion gear 118 which turns brake rod 103. Rubber pad 120 is at the distal end. Gear 118 is sized to turn 180 degrees over the excursion of brake pedal 100 over its rotation from up position to bottom latched position (latch not shown). In this manner, the rotary motion of brake rod 103 which operates on the two rear double circular rotating transporters, such as casters or wheels is conveyed along the side via extension rod 109 through meshed bevel gears (not shown) in rear housing 107 and then onward through brake rod 111 at the front through front meshed bevel gears in 107 to operate the front two double caster ring brakes.

The operation of the ring brake elements 128 above each double caster is illustrated in side view 13C and top view 13D. Caster 91 (depicted as a single caster for clarity) with arm 125 and swivel ball bearing 126 is shown under ring brake element 128 which is centered on swivel axis 127. The bottom edge of ring brake 128 may have a ring of high friction material. Ring brake element 128 is housed in a cylinder housing (not shown) to restrict its movement to the vertical direction. The end of the operating brake rod is machined into a semicircular cam 130 and penetrates the side of 128 inside a square hole. A compression spring (not shown) exerts downward force 131 atop ring brake 128 forcing it down in contact with the top of caster 91 unless cam 130 is turned with its flat side downward within hole 129 which action lifts it out of contact releasing the braking force. "flat side down" position of all cams 130 coincide with the up (brake released) position of brake pedal 100. The top view of ring brake element 128 of FIG. 13D shows how it's being centered over the swivel axis 127 of dual caster 91 permits action regardless of caster swivel position. The redundancy of having 4 separate local braking springs atop the 4 ring brake elements is also a safety feature. While tow loop 95 is shown in FIG. 11 by itself on figure 89, in an alternate embodiment, two further tow loops 95 or protruding rubber bumpers (not shown) can be provided on the frame 89's side with brake pedals 100, 101 in an area spaced apart on each side of brake pedals 100, 101 to act as a bumper for brake pedals 100 and 101.

Figure 14A:
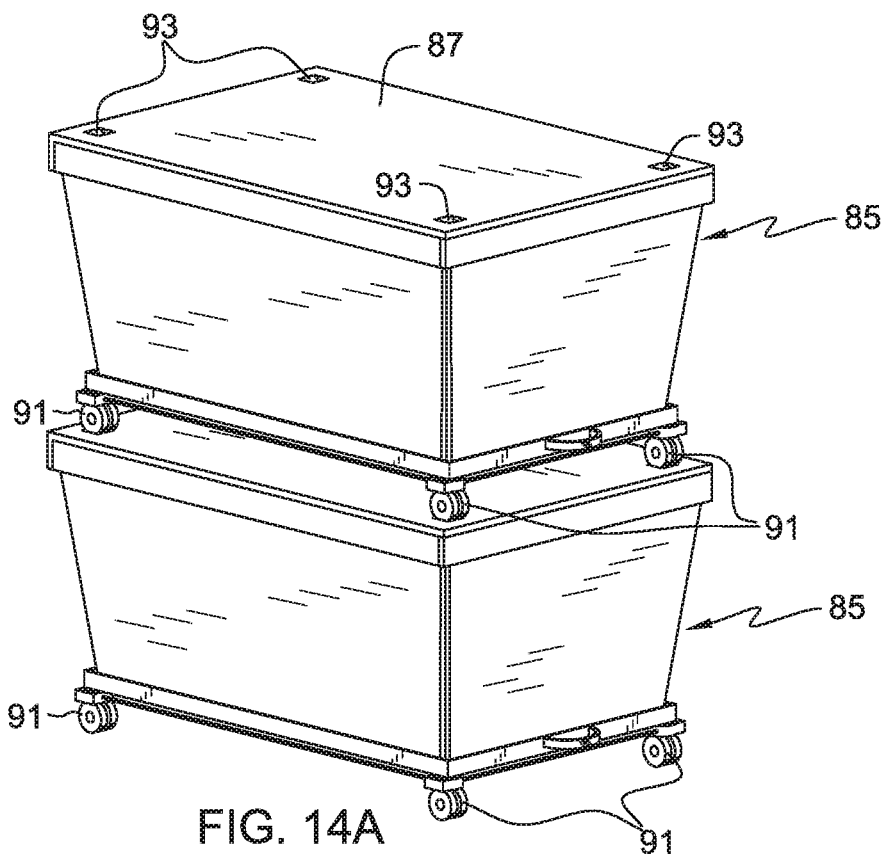
FIGS. 14A-14C illustrate how the push-pull cart of FIG. 10 is stackable in either an assembled or collapsed configuration.
Figure 14B:
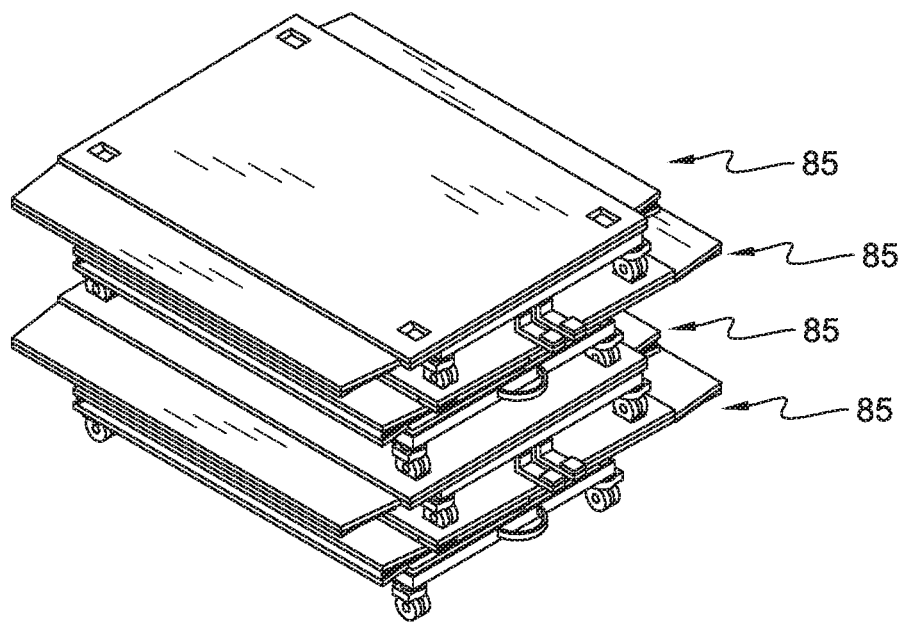
Figure 14C:
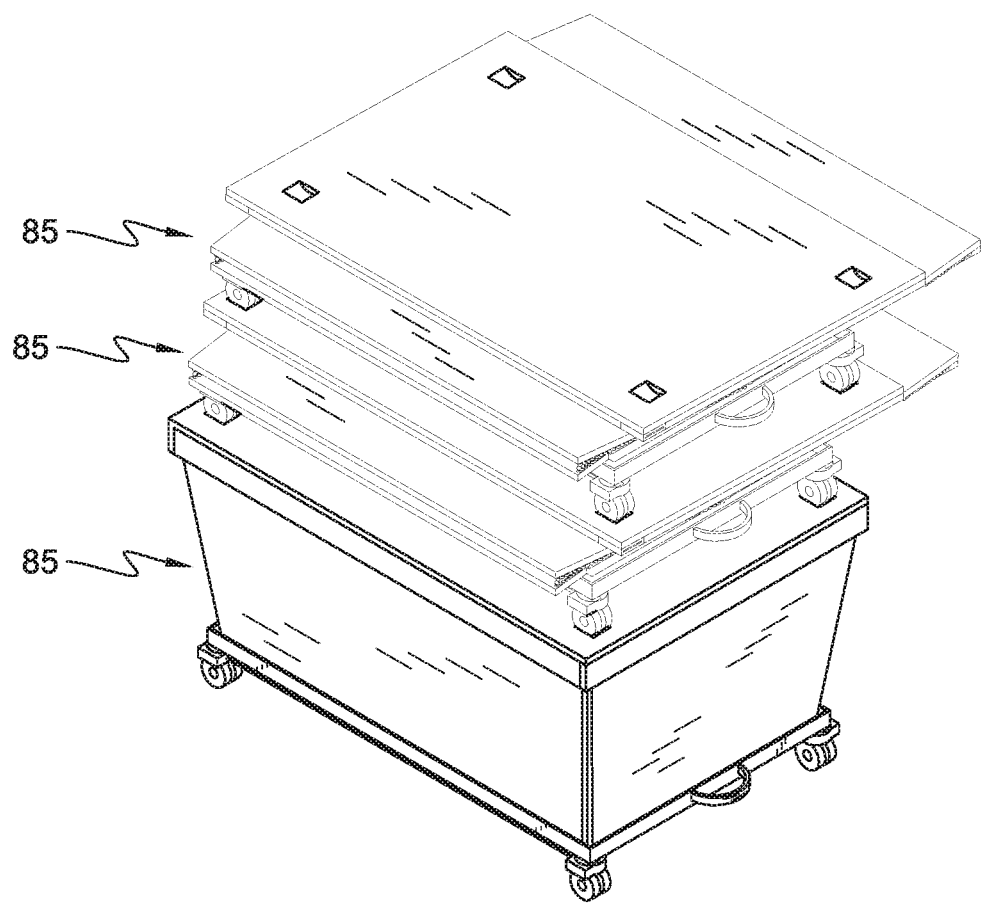

FIGS. 14A-14C illustrate the stackability of cart 85 in either the assembled or collapsed configurations. In FIG. 14A two assembled carts 85 are shown stacked atop one another with casters 91 of the top cart nestled in recesses 93 in top cover 87 of the lower cart 85. Although not limited to a stack of two assembled carts 85, in most cases space limitations or difficulty in lifting to greater heights make such stacks impractical. In FIG. 14B, a stack of three collapsed carts 85 is shown. It is practical to stack two to seven or more collapsed carts 85 as shown, again with casters 91 immobilized and captured within recesses 93. Note that by stacking collapsed carts 85 in alternating rotations as shown, a stable stack results with no tendency to topple sideways. In FIG. 14C, two collapsed carts 85 are shown stacked atop an assembled cart 85. This type of stack configuration is possible since with either collapsed or assembled carts 85, the method of stacking with casters nestled within recesses 93 in covers 87 is the same. Optionally, further fold lines (not shown) can be provided so that all of the panels of cart 85 can fold within the perimeter confines of chassis frame 89, to prevent damage of adjacent carts 85 or fixed objects.

FIGS. 15A-15I show an alternate embodiment where a push cart 185 supported on frame 189 having a plurality of wheeled circular rotating transporters, such as casters or wheels 191, tow loop 195 and brake pedals 201, 202, is height adjustable by means of a plurality of fold lines 198, 198*a*, 199 and 199*a*, which fold lines 198, 198*a*, 199 and 199*a* separate respective side panels 186 etc into respective joined but foldable pairs of half panels 186*a*/186*b*, 186*c*/ 186*d*, 186*e*/186*f* and 186*g*/186*h* when folded along the respective fold lines 198, 198*a*, 199 and 199*a*. The cover panel 187 is likewise separated by cover fold line 188 into a pair of respective half panels 187*a*/187*b*, when folded along the respective fold line 188.

Figure 15A:
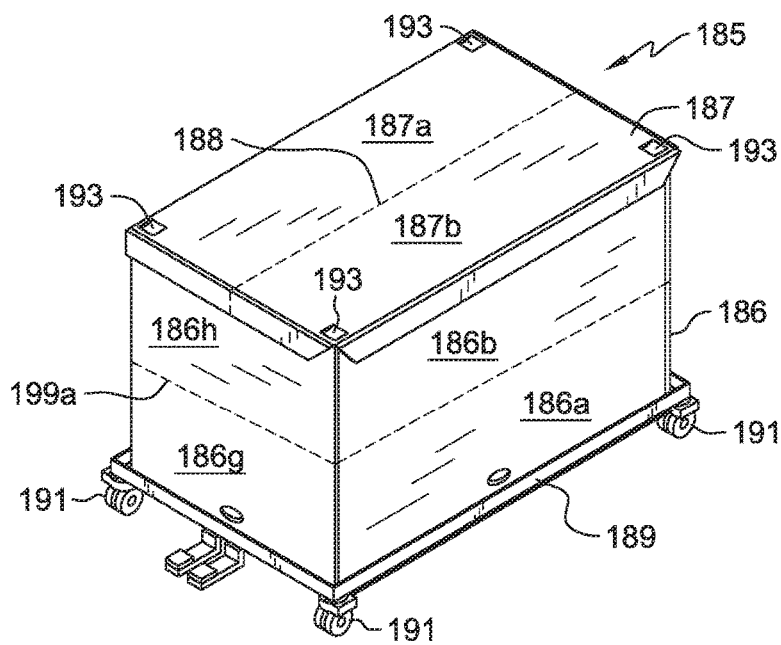
FIGS. 15A-15G show an alternate embodiment where a push cart is height adjustable by means of a plurality of fold lines, which separate respective side panels and the cover panel into respective half panels when folded along the respective fold lines.
Figure 15B:
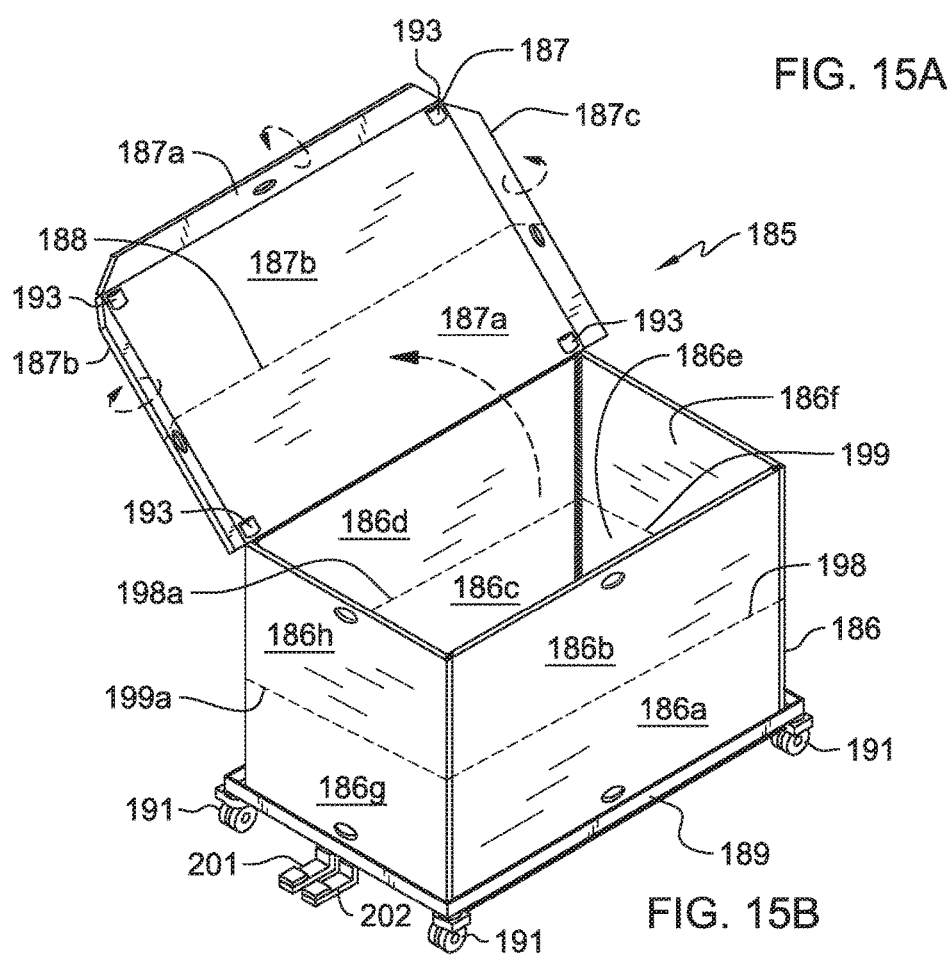
Figure 15C:
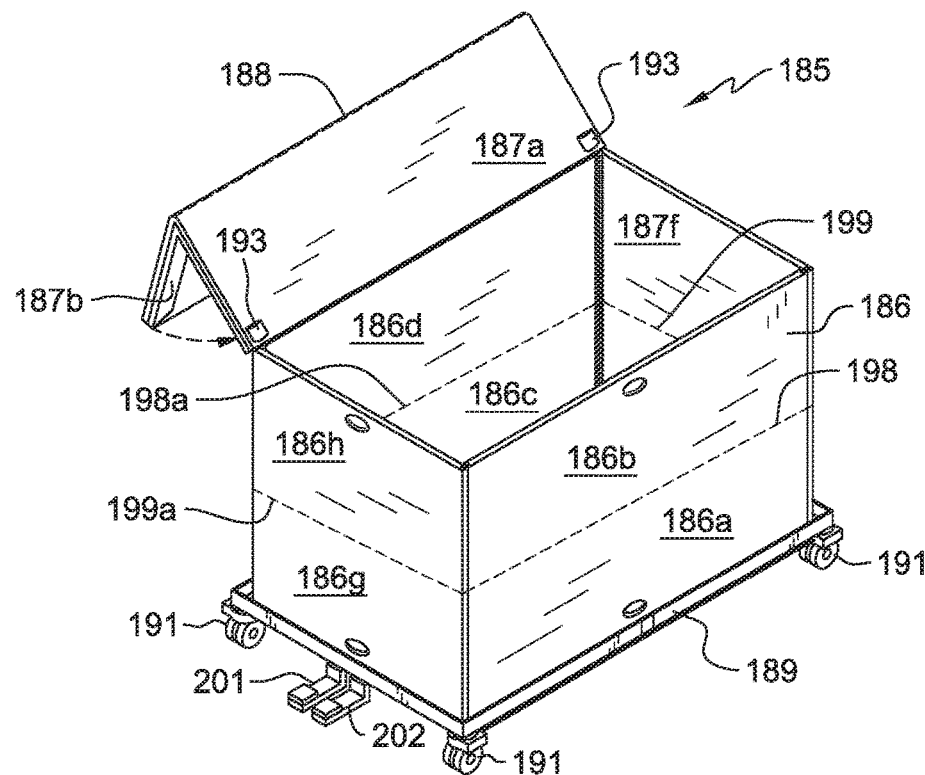
Figure 15D:
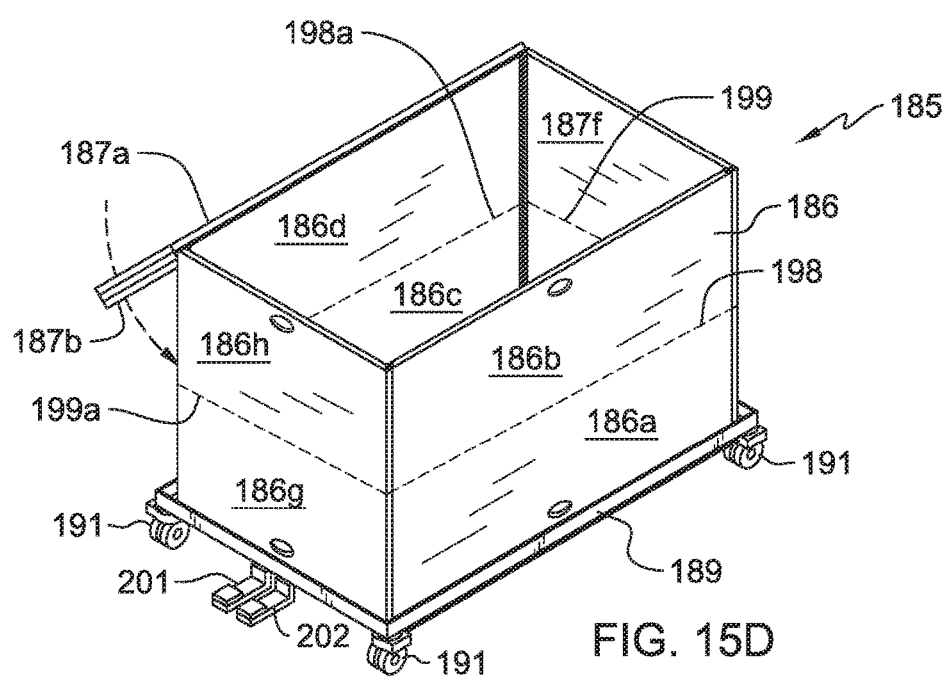
Figure 15E:
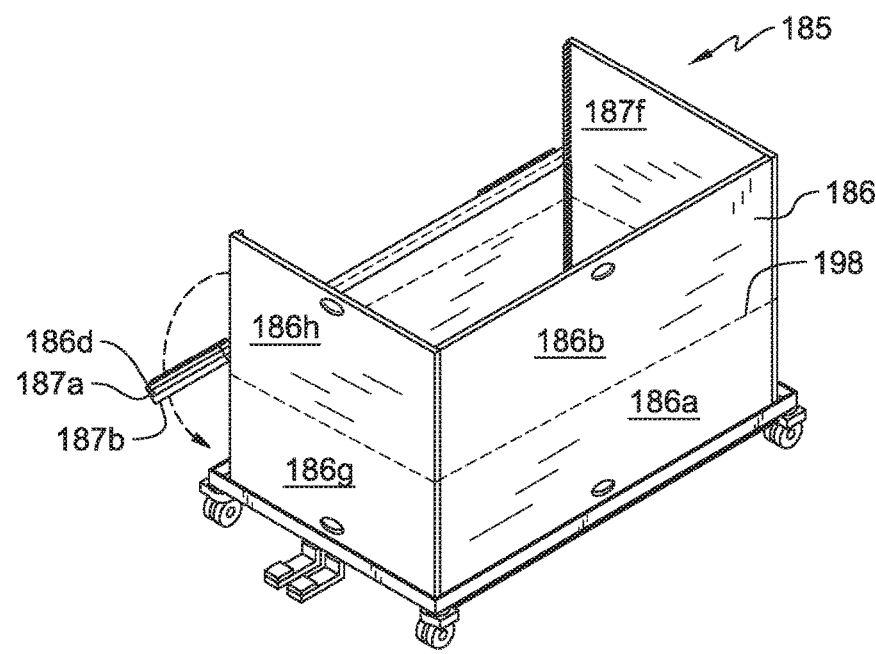
Figure 15F:
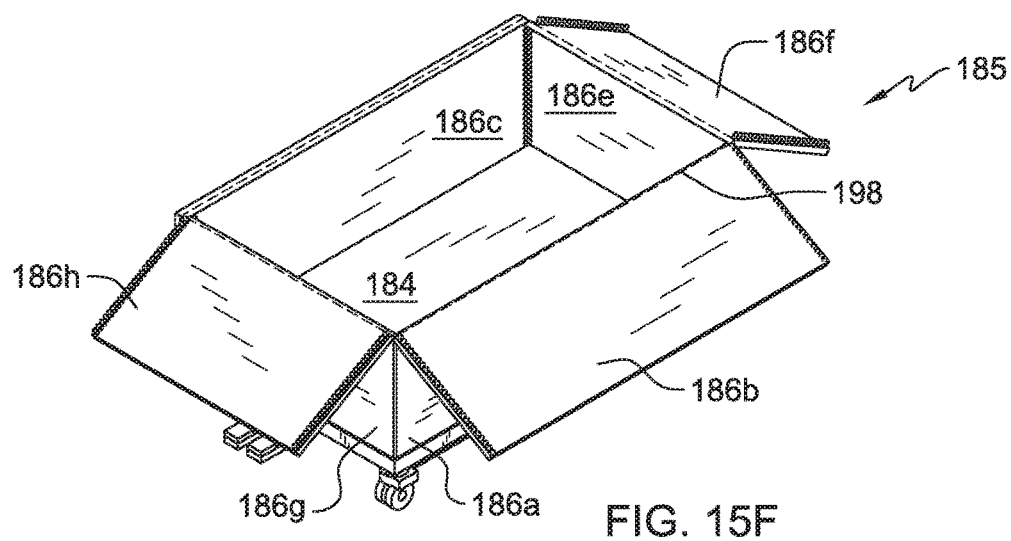

FIG. 15A shows push cart 185 unfolded and closed by cover 187. FIG. 15B shows push cart 185 unfolded and opened by opening of cover 187. FIG. 15C shows push cart 185 unfolded and but where open cover 187 is folded in half along fold line 188 between cover half panels 187*a* and 187*b*. FIG. 15D shows push cart 185 unfolded and but where open cover 187 is folded in half along fold line 188 between cover half panels 187*a* and 187*b*, which are flush against each other during further folding sequence. FIG. 15E shows push cart 185 itself beginning to be folded into a smaller height size wherein half panels 186*c* and 186*d* are folded along fold line 198*a*. FIG. 15F shows the folding down in the height reduction sequence of the remaining half panels 186*e*/186*f*, 186*a*/186*b* and 186*g*/186*h*, until flush with each other in the final reduced height configuration of FIG. 15G with all folded side panels tucked inside the cart. Where they may inadvertently open during use, facing folded panels are snapped together using pairs of strategically placed snap fasteners (not shown).

In the transformational sequence of cart 185 from full height to half-height as shown in FIGS. 15A-15G, the direction as well as the sequence of folding is important. For example, the folding of cover flaps 187*c*, 187*d*, and 187*e* upward over the top of cover 187 in FIG. 15B must be followed to support the further folding shown in FIGS. 15C-15F.

Figure 15G:
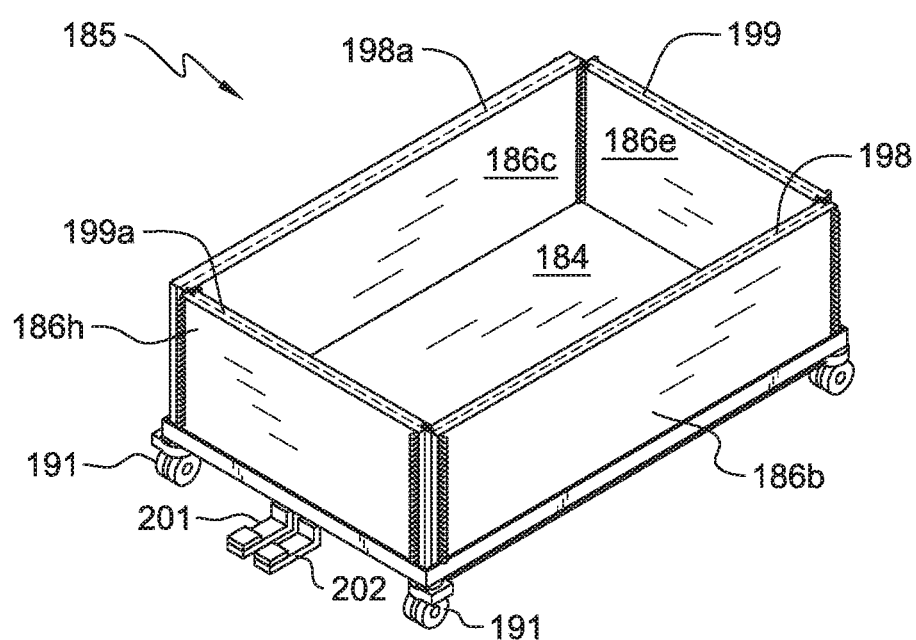
Figure 15H:
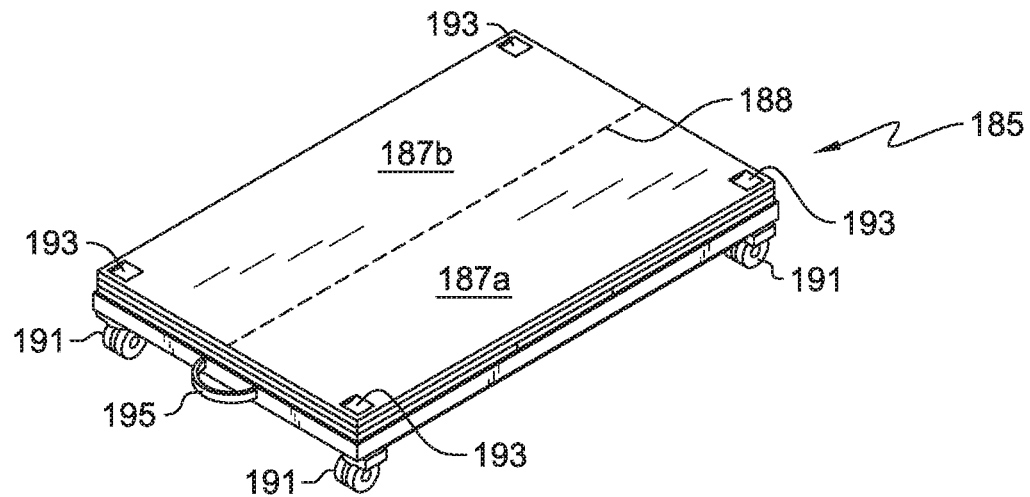
FIG. 15H shows the cart of FIG. 15G when re-folded into a collapsed configuration atop metal base with cover panels atop.
Figure 15I:
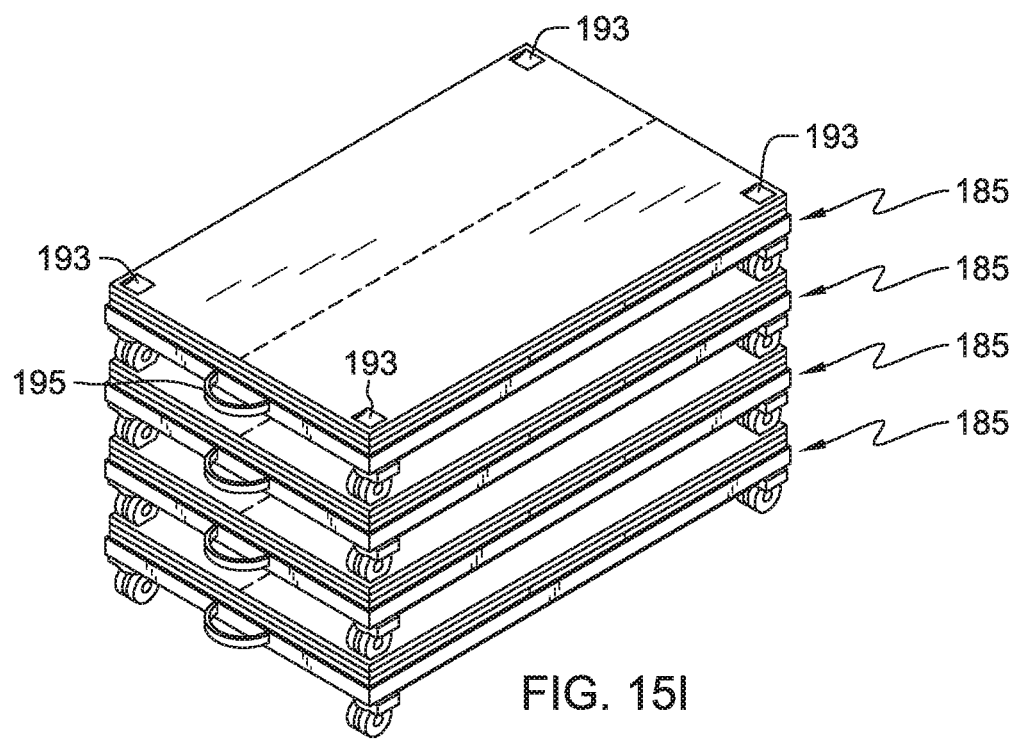
FIG. 15I shows a stack of collapsed carts with casters of upper carts nested in cover panel indentations.

In FIG. 15G the cover 187 half-panels as well as the upper halves of the side panels have been folded inside the half-height container as shown. Push cart 185 can be used in this configuration (without a cover) when it is useful to do so. To collapse push cart 185 to a flat configuration as shown in FIG. 15H from half-height configuration of FIG. 15G, folded side and cover panels are unfolded from within cart 185. Then side corner edges are detached progressively from the top to the metal frame at bottom by separating nibs. Now the spread-out but still attached panels are folded in a different sequence to achieve the collapsed configuration shown in FIG. 15H. Note that both panels of cover 187 now appear at the top of the collapsed cart 185. Carts are simply stacked as shown in FIG. 15I with circular rotating transporters, such as casters or wheels 191 nestled within cover indentations 193 to prevent upper carts from sliding off the next lower cart in the stack. A stable stack of seven or more carts is easily possible. It is further noted that respective carriers of carts 185 of FIG. 15A to FIG. 15G can be provide with U-pins 21, which can act as safety pins to reinforce respective carriers of adjacent panels of cart 185, as shown in FIG. 3.

With respect to the embodiment shown in FIG. 15I, when carts 185 are stacked, there are not protruding parts extending outward from the perimeter of the chassis figure 189, other than the brake pedals 201, 202 which extended outward in a plane lower than the plane of the chassis frame 189, and the tow loops 195, which act as bumpers between adjacent carts 185. Therefore, other than tow loops 195, all of the parts of carts 185 are within perimeter confines of the chassis frame 189, and the brake pedals 201, 202 are recessed under the respective frame 189 of an adjacent cart 185. As a result, there is no risk of damage to all of the folded-down panels 187*a*, 187*b*, etc., shown in FIGS. 15A through 15G. Furthermore, when all the panels 187*a*, 187*b*, etc., are unfolded and in a position of upright use, as in FIG.

15A, filled with contents, there are also no protruding parts other than tow loop 195 and recessed brake pedals 201, 202. Therefore, in shipment of multiple carts 187 filled with contents, all of the upright panels 187a 187b are protected from damage during shipment. While tow loop 195 is shown in FIG. 15H by itself on the frame of cart 185, in an alternate embodiment, a further tow loop 195 (not shown) can be provided on the frame 189's side with brake pedals 201, 202, in an area adjacent to and overlapping brake pedals 201, 202, to act as a bumper for brake pedals 201,202.

FIGS. 16, 16A, 16B, 17, 17A, 17B, 17C, 17D, 17E, 18A, 18B, 18C and 18D show an alternate embodiment for a watertight storage cart 386 for transporting water, food or vital supplies to remote geographic areas, where no public water supply is available, or is temporarily unavailable because of weather disasters, such as hurricanes, typhoons, tsunamis or earthquakes.

Figure 16:
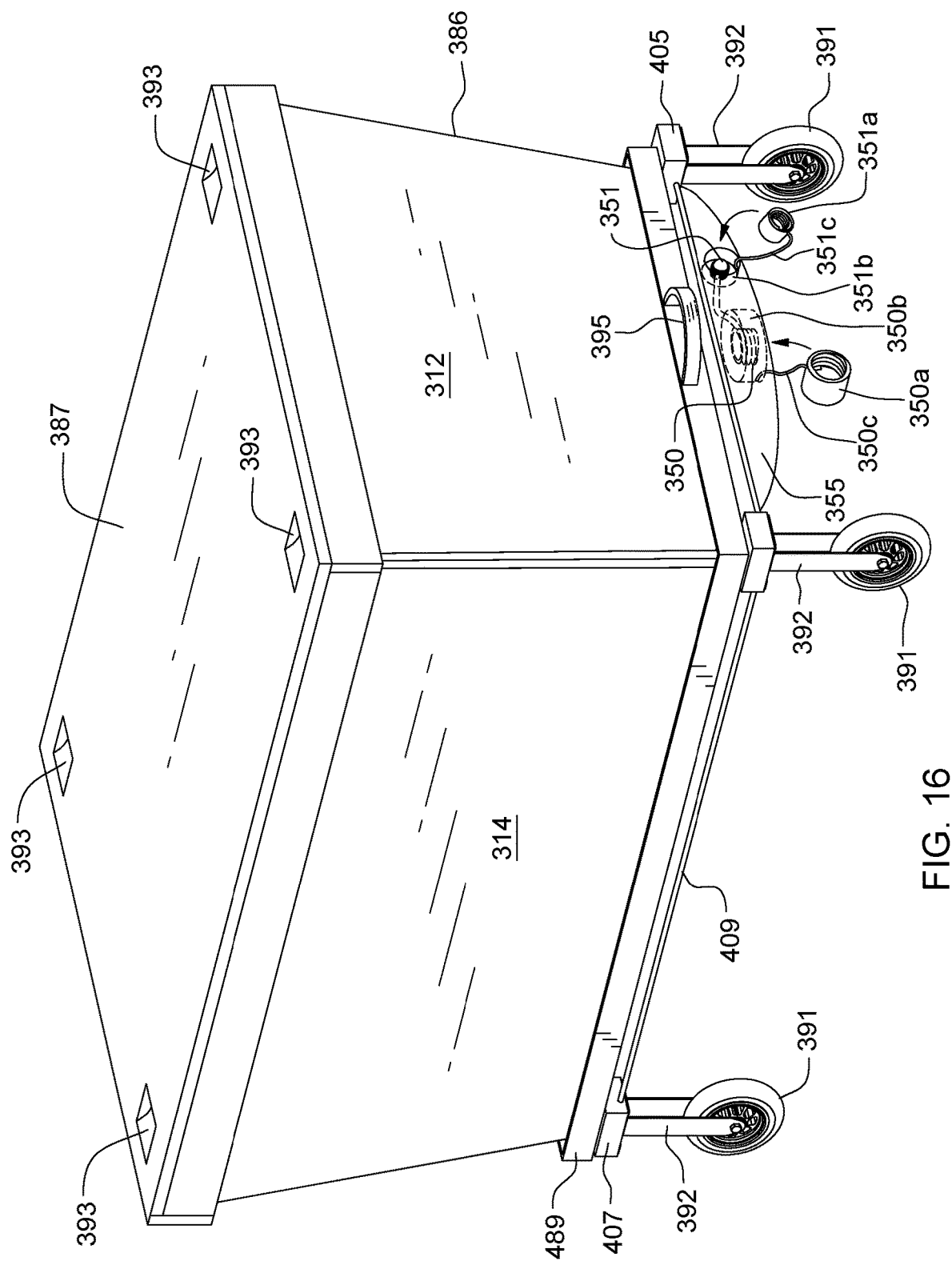
FIG. 16 is a perspective view of an alternate embodiment for a water storage and dispensing cart, constructed of folding sides, joined by U- or J-channel joints, which extend laterally along the edges of adjacent panels, for use where no public water supply is available, or is temporarily unavailable because of weather disasters, such as hurricanes, typhoons, tsunamis or earthquakes.
Figure 16A:
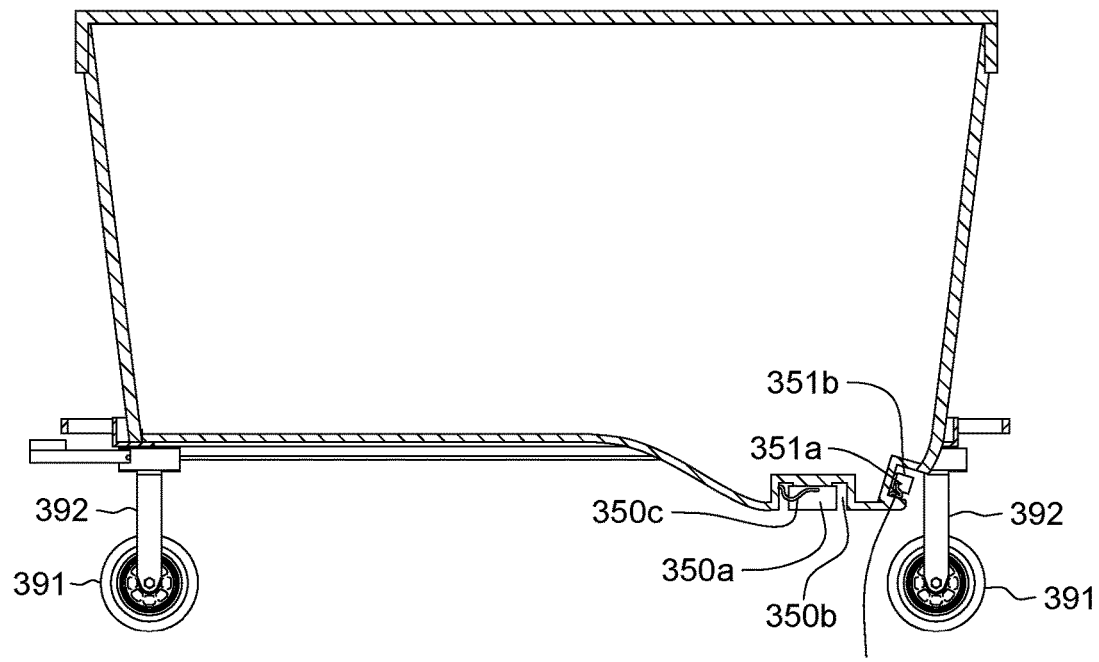
FIG. 16A is a side elevation view in cross section of the alternate embodiment for a water storage and dispensing cart, as in FIG. 16.
Figure 16B:
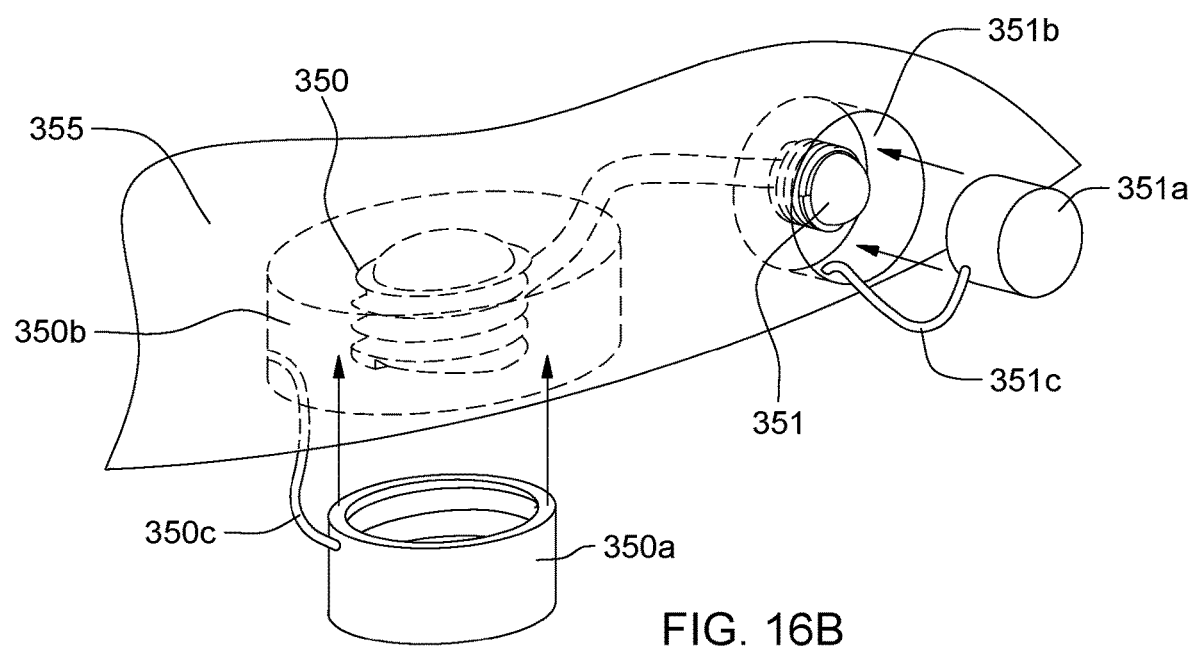
FIG. 16B is a close-up detail view of the water dispensing spout portion of the water storage and dispensing cart, as in FIG. 16.

As shown in FIGS. 16, 16A and 16B, cart 386 stores, transports and dispenses up to approximately 30 gallons of water. This cart 386 has the same basic features as the carts of FIGS. 1-15, but the added features clearly distinguish its use to transport, store, and disburse water. As shown in FIGS. 17, 17A, 17B, 17C, 17D and 17E, its corner sides will connect and pull apart using molded J-channels or U-channels on the edges. The J-channels or U-channels give it a good seal for water tightness. The plastic material used is made to store food and water. As shown in FIGS. 16, 16A and 16B, the cart 386 that is being used to transport and disburse water has a spout 350 with push button 351 on one lower side of cart to disburse the water. The push button and spout area 350 should be about one and one half (1½) inch lower than the rest of the bottom of the cart 386 and should be about three (3) inches in diameter. Caps 350a and 351a cove the spout 350 and push button activator 351. The cart 386 has thermal protection to it, with insulated foam or gel panels, keeping its contents either hot or cold longer than most transport equipment. Being able to hold approximately 300 lbs (35 gallons), preferably 400 lbs. (48 gallons) of water as well as being water tight, the contour of the bottom 384 of the cart 386 must be pitched so water can empty into the spout when the rubber button 351 is pushed in which lifts an interior plug up (covering the hole) in bottom of cart for water to drain out from. Both ends of the plug and button 351 are attached as one solid piece. Pushing one end in (rubber button on outside) lifts the plug on the inside of cart. The spout 310 on the bottom panel 384 of the cart where the water comes out of is a standard size diameter of a garden hose which can be easily attached to the spout 350. Both the push button 351 on the outside and the outside spout opening 350 have threads on them to screw on a protective cap 350a or 351a so as not to engage the rubber button 351 or spout 350. These protective caps 350a and 351a are made of hard rubber/plastic which will only unscrew if first pushed in and held in before the threads start to unwind the cap 350a or 351a. This is a safety feature so water isn't dispersed unintentionally.

Cart 386 includes a bottom base floor 384, preferably pitched toward a water dispensing spout 350, with two upwardly foldable end panels 310, 312 and two side panels 314, 316. While other mirror image connections may apply, FIGS. 17, 17A, 17B, 17C, 17D and 17E show male insertion walls 310a, 310 b insertable in channels 316a, 316b of adjacent walls and 314a, 314b of adjacent panels 314 and 316. A joinable cover 387 is attached to side panel 316 at a common edge.

As shown in FIGS. 18A, 18B, 18C and 18D, the cart 386 also has hook (hitch) 395 on the opposite ends of the cart 386's chassis to hook up the cart 386 from either end with a hitch to pull it. The push button 351 and spout 350 will be on the opposite side of the cart 386 from the brake pedals 400 and 401. The four wheels 391 to this cart will need to be bigger and stronger maybe the size of the wheels used on hospital gurneys. They need to be able to be used on uneven dirt road and rock surfaces.

As shown in FIG. 16, the indented wheel wells 393 on the top covers 387 of carts 386 need to be reinforced with thicker plastic mold to hold the 300 to 400 lbs. of weight. These carts 386 filled with water can be pushed up a portable ramp onto either a table or on top of another cart, put the brake pedals 400, 401 on (which makes the cart stationary). Then at the opposite end of the cart 386, thereunder unscrews both safety caps 350 and 351a and dispenses your water by pushing in the rubber button 351 to open spout 350 for pouring water therethrough.

Figure 18A:
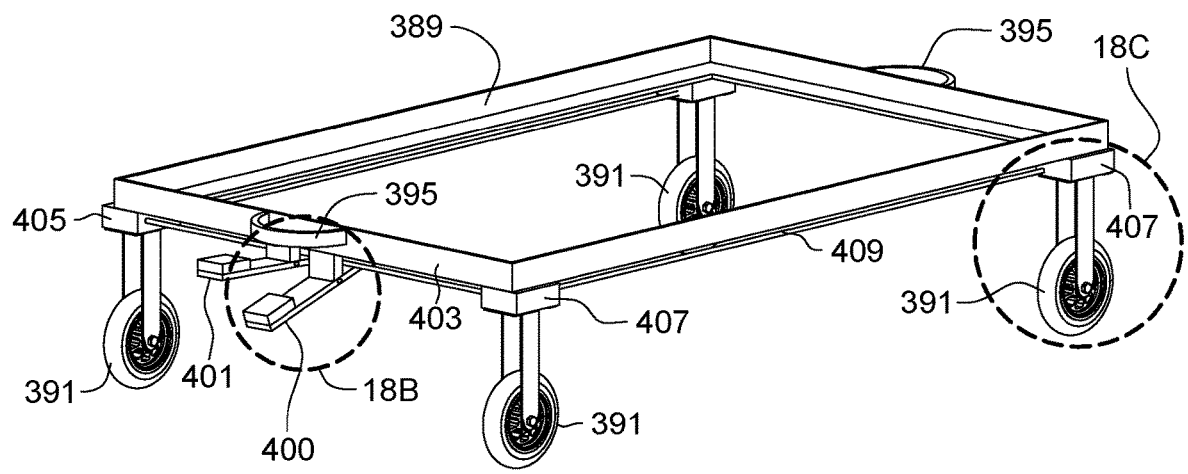
FIGS. 18A-18D show as optional central braking system.
Figure 18B:
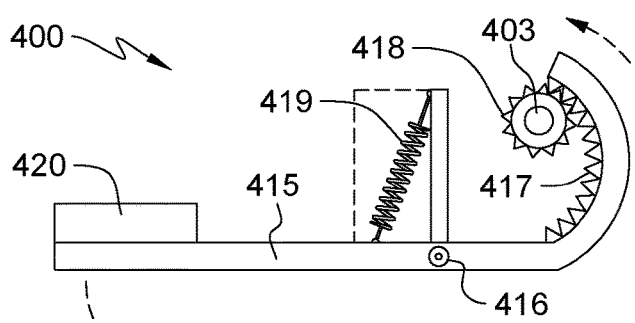
Figure 18C:
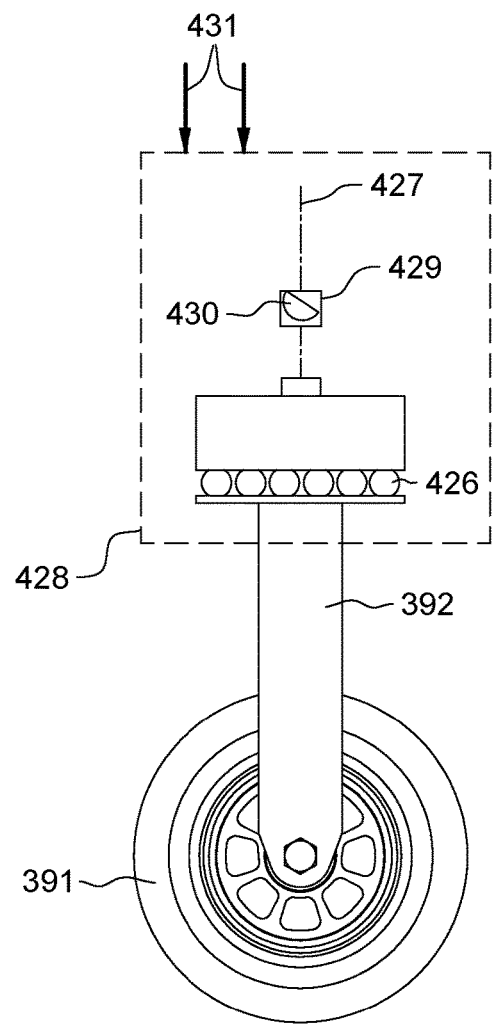

FIG. 18A shows bottom metal frame 389 detached from container section 386 for clarity. Brake pedal 400 and release pedal 401 are shown at the rear of cart 385; brake rod 403 goes from, housing 407 to housing 405 through the brake pedal assembly gear 418 (shown in FIG. 18B). Housings 405 contains a ring brake element as depicted in FIGS. 13C and 13D. Housings 107 as also shown on FIG. 18C include ring brake elements as in 405, but they also have a pair of meshed bevel gears (preferably molded plastic) to extend the action of brake rod 403 synchronously to extension rod 409 and onward to front brake rod 411). FIG. 18B illustrates the side view of brake pedal assembly 400. Rigid chassis 415 is pivoted at pivot point 416 and pulled up to the "brake not applied" position by robust extension spring 419. The front of chassis 415 is configured as a sector of internal gear 417 which is meshed with pinion gear 418 which turns brake rod 403. Rubber pad 420 is at the distal end. Gear 418 is sized to turn 180 degrees over the excursion of brake pedal 400 over its rotation from up position to bottom latched position (latch not shown). In this manner, the rotary motion of brake rod 403 which operates on the two rear double circular rotating transporters, such as casters or wheels is conveyed along the side via extension rod 409 through meshed bevel gears (not shown) in rear housing 407 and then onward through brake rod 411 at the front through front meshed bevel gears in 407 to operate the front two double circular rotating transporters, such as or wheel, ring brakes.

Figure 18D:
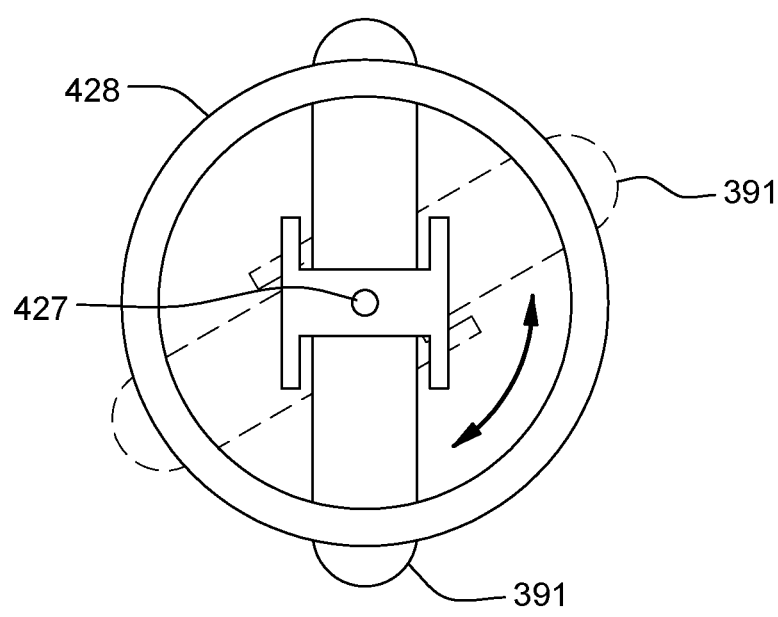

The operation of the ring brake elements 428 above each wheel 391 is illustrated in side view 18C and top plan view 18D. Wheel 391 with bracket 392 and swivel ball bearing 426 is shown under ring brake element 428 which is centered on swivel axis 427. The bottom edge of ring brake 428 may have a ring of high friction material. Ring brake element 428 is housed in a cylinder housing (not shown) to restrict its movement to the vertical direction. The end of the operating brake rod is machined into a semicircular cam 430 and penetrates the side of 428 inside a square hole. A compression spring (not shown) exerts downward force 431 atop ring brake 428 forcing it down in contact with the top of wheel 391 unless cam 430 is turned with its flat side downward within hole 429, which action lifts it out of contact, releasing the braking force. The "flat side down" position of all cams 430 coincide with the up (brake released) position of brake pedal 400. The top view of ring brake element 428 of FIG. 18D shows how it is being centered over the swivel axis 427 of wheel 391 permits action regardless of wheel swivel position. The redundancy of having four separate local braking springs atop the four ring brake elements is also a safety feature.

Two hitch tow loops 395, with or without protruding rubber bumpers (not shown) are provided on the frame 389's side with brake pedals 400, 401 in an area spaced apart on each side of brake pedals 400, 401 to act as a bumper for brake pedals 400 and 401.

For added stability, as shown in FIGS. 16, 16A and 16B, the spout 350 can be configured within an enclosed sturdy shallow molded bubble portion 355, of injection molded polyethylene or polycarbonate, with only the female hose connection exposed, and the push button activator 351 also exposed. Such a bubble enclosure portion will protect the water dispending spout plumbing from damage incurred over rough terrain and rubble. Elastomeric silicone seals can also optional be used to improve water tightness at the edges of the bubble enclosure portion.

Figure 19:
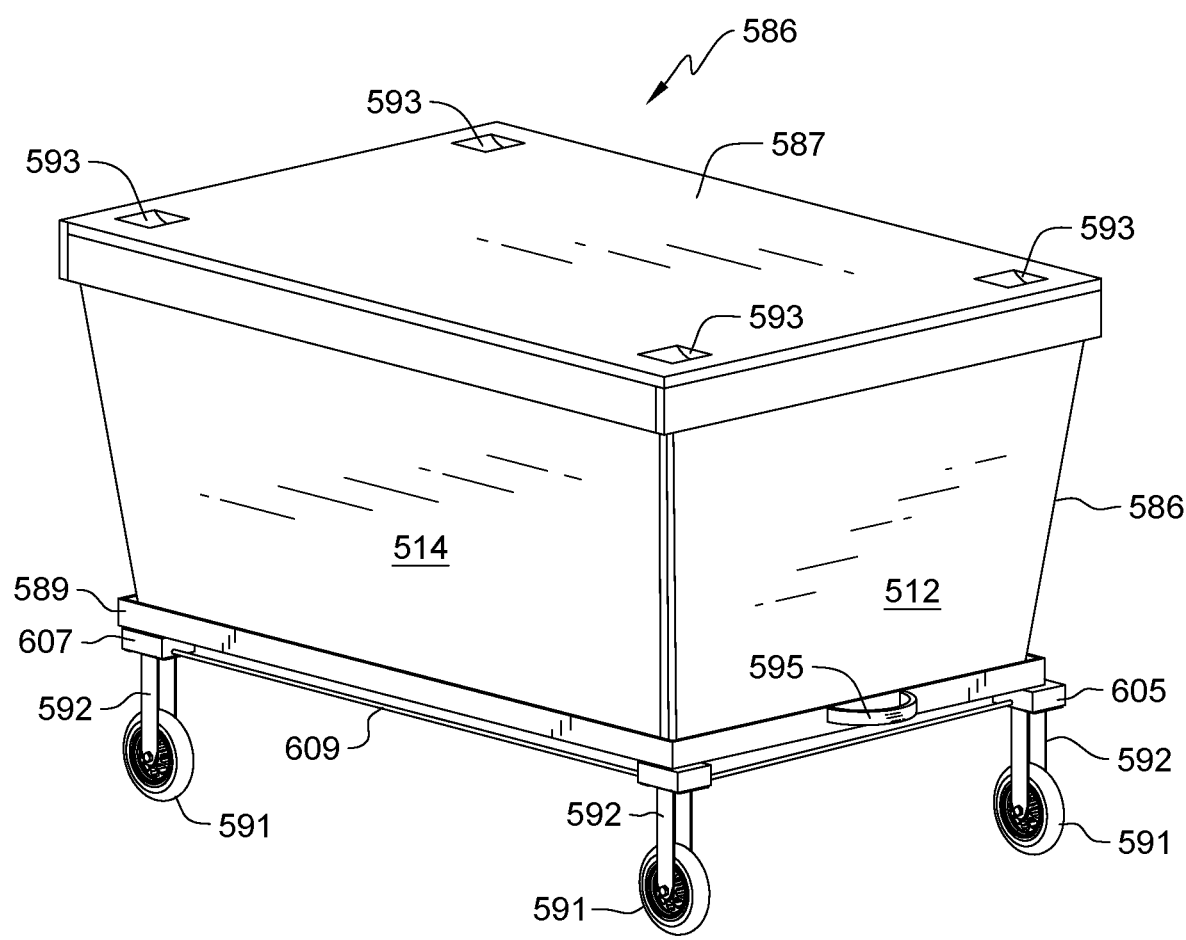
Figure 20:
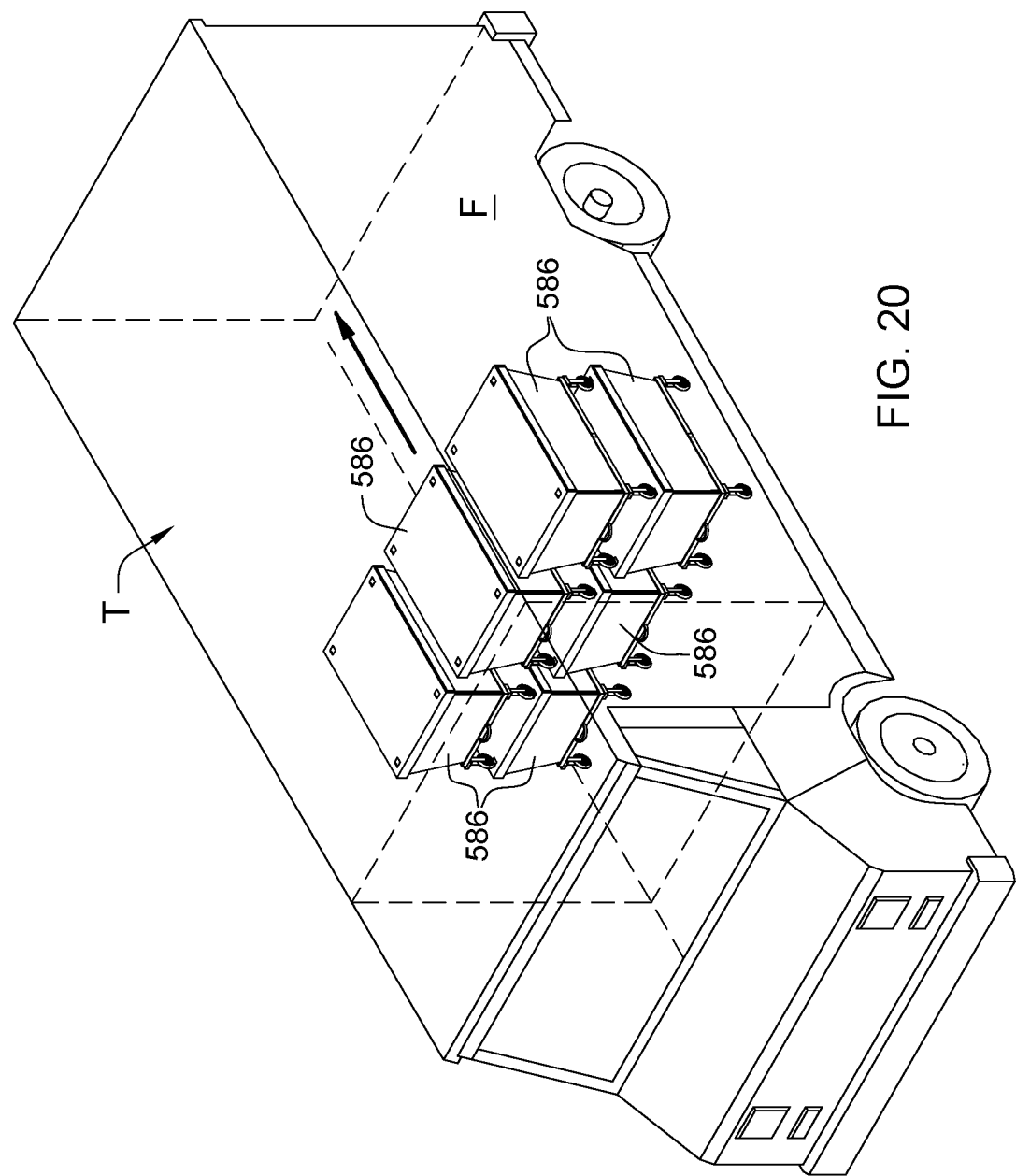
Figure 21:
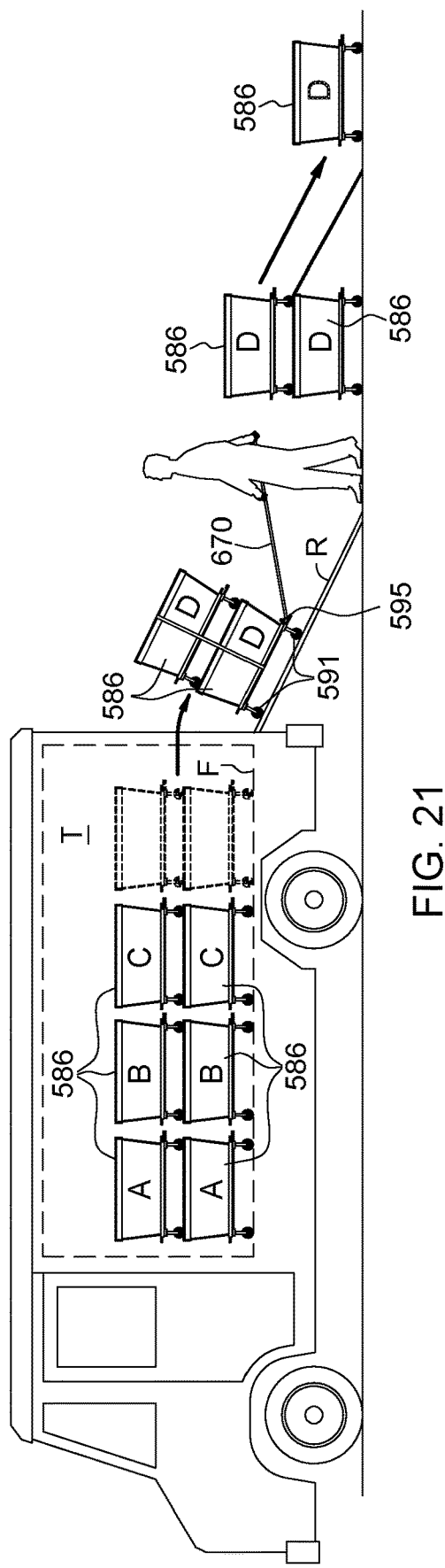

FIGS. 19, 20 and 21 depict an alternate embodiment for stackable cargo carrying container carts 586 in general (preferably without a water spout), where the cargo carrying collapsible, reusable push/pull carts 586 are stacked on a floor "F" within a delivery truck "T", as shown for smoother delivery to customers.

FIG. 19 shows a collapsible cargo carrying collapsible, reusable push/pull cart 586.

FIG. 20 shows an array of multiple related cargo carrying collapsible, reusable push/pull carts 586 stacked upon a floor "F" within an interior of a trailer of a transport truck "T", and where the stacked sets of cargo carrying collapsible, reusable push/pull carts are arranged side by side in a plurality of rows, such as three rows shown.

FIG. 21 shows the array of multiple sets of cargo carrying collapsible, reusable push/pull carts 586 stacked, by customer destination indicia "A", "B", "C", "D", etc, where the indicia may be text, images, customer logos, geographic or GPS addresses or electronically scanable bar-coded strips related to a particular destination of a particular customer, and showing a set of cargo carrying collapsible, reusable push/pull carts 586 being manually unloaded on an exit ramp, "R" without the use of weighty storage transport pallets and without the need for heavy machinery to move the stacked cargo carrying collapsible, reusable push/pull carts. The set of carts being unloaded are identified with indicia "D" identifying a particular destination of a particular customer associated therewith. FIG. 21 further shows ease of manual unloading by a worker holding a pulling rod 670, having a hook or other grasping fastener at a distal end thereof, engageable with a hitch 595 of cargo carrying collapsible, reusable push/pull cart 586.

Each customer's diverse delivery supplies are organized in one or more cargo carrying container carts 586 from the set of carts identified as "D", which saves labor and money by avoiding weighty cargo holding pallets and heavy machinery needed to move the pallets and cargo carried, thereon.

This is a vital function for the cargo carrying collapsible, reusable push/pull cart 586 is that they can be filled with individual items for each individual delivery of customer destination indicia "A", "B", "C", or "D", etc. that cargo carrying collapsible, reusable push/pull carts 586 are being delivered to. All delivery companies whether delivering items in a Tractor Trailer or a Step Van to their customers, can be placed inside a cargo carrying collapsible, reusable push/pull carts 586 and rolled onto the truck T (by a ramp "R" or lift gate). Then each cargo carrying collapsible, reusable push/pull cart 586 can be taken off and unloaded from the truck "T" the same way and delivered to the customer associated with customer destination indicia "A", "B", "C" or "D", etc. Instead of the driver having to unload each item himself, when he gets to the customer's destination stop, the driver will just deliver one or more cargo carrying collapsible, reusable push/pull carts 586 full of items associated with that customer destination indicia "A", "B", "C" or "D", etc., when he gets to the customers destination stop. This will save a huge amount of delivery time. The normal delivery time for most products can be cut in half. The cargo carrying collapsible, reusable push/pull carts 586s can be preloaded the night before the scheduled delivery and loaded onto the truck "T" in the array shown in FIG. 21, according to the scheduled stops the driver needs to make. This saves the driver a good amount of delivery time, thus saving the delivery company a lot of money.

FIG. 19 shows cargo carrying collapsible, reusable push/pull carts 586 for transporting cargo or other supplies to commercial trucking destinations, as shown in the storage array of carts "A", "B", "C" or "D" etc. Cart 386 stores, transports and delivers commercial cargo in up to approximately 4 to 6 cubic feet of storage space of water. This cart 586 has the same basic features as the carts of FIGS. 1-15, but uses wheels 591 instead of casters. While the cargo carrying collapsible, reusable push/pull carts can be any of the carts shown in FIGS. 1-15, preferable the cargo carrying collapsible, reusable push/pull carts 586 shown in FIG. 19 have corner sides will connect and pull apart using molded J-channels or U-channels on the edges. The J-channels or U-channels give it a good seal for water tightness. The cart 586 has thermal protection to it, with insulated foam or gel panels, keeping its contents either hot or cold longer than most transport equipment.

Figure 17:
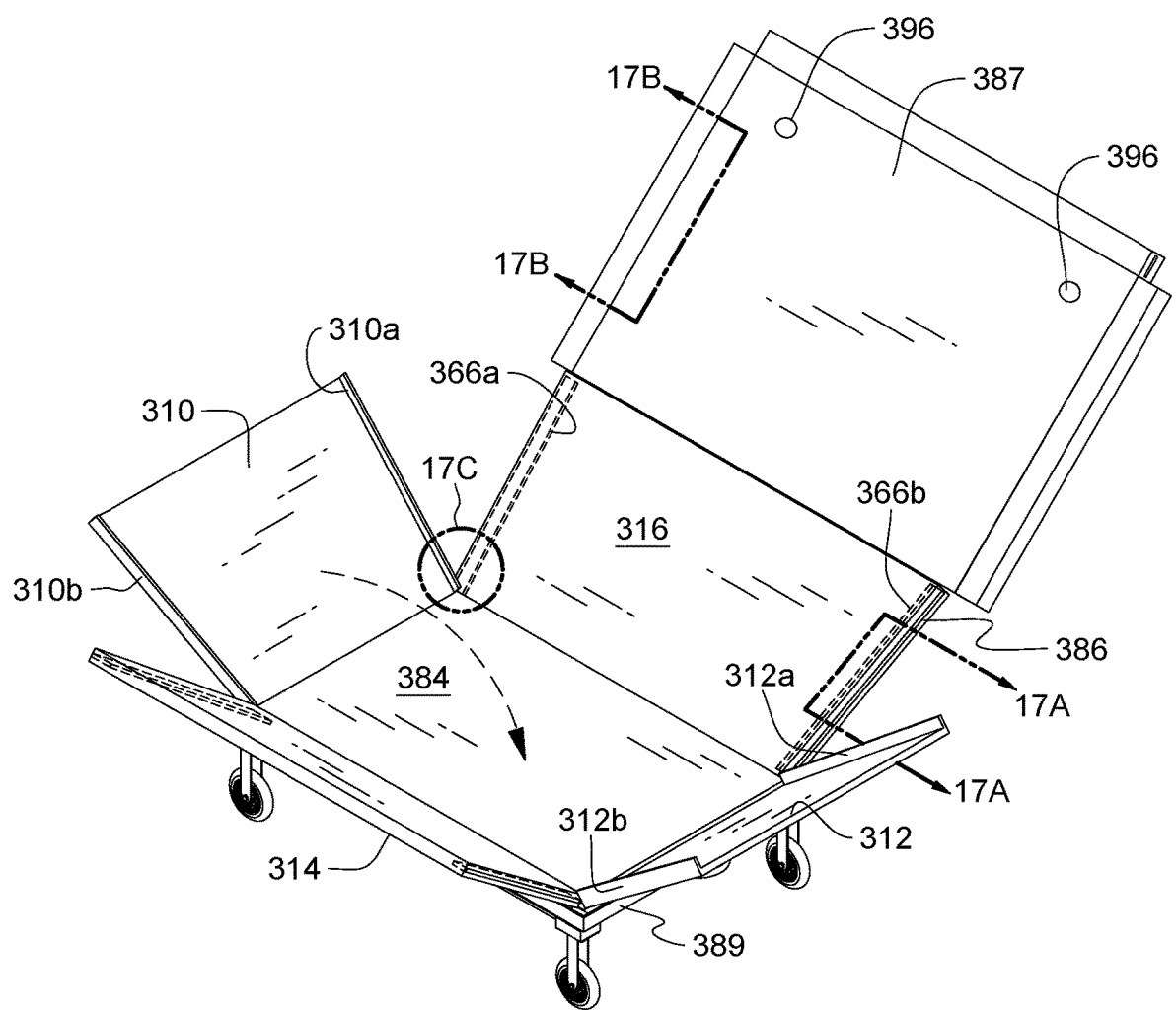
FIG. 17 is a perspective view of the water storage and dispensing cart, shown in an unfolded configuration.
Figure 17A:
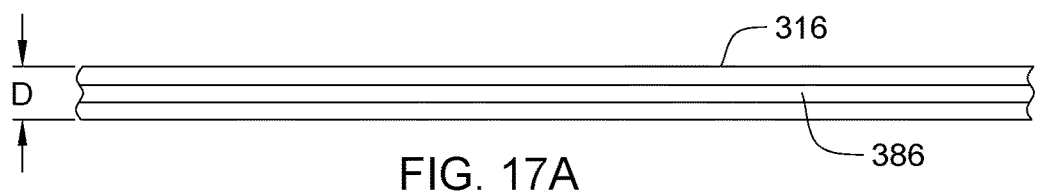
FIG. 17A is a close up detail end view of a panel of the cart of FIGS. 16 and 17, showing depth of the U-channel, taken along view lines 17A-17A of FIG. 17.
Figure 17B:
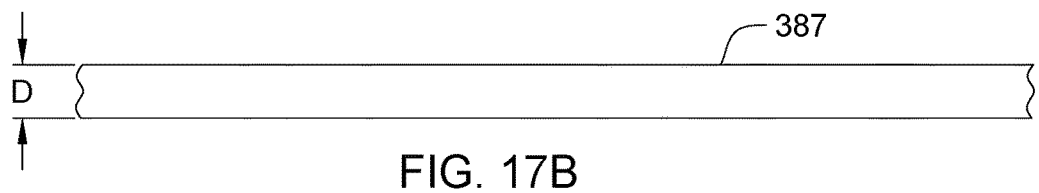
FIG. 17B is a close up detail end view of an adjacent panel to that of FIG. 17A, taken along view lines 17B-17B of FIG. 17.
Figure 17C:
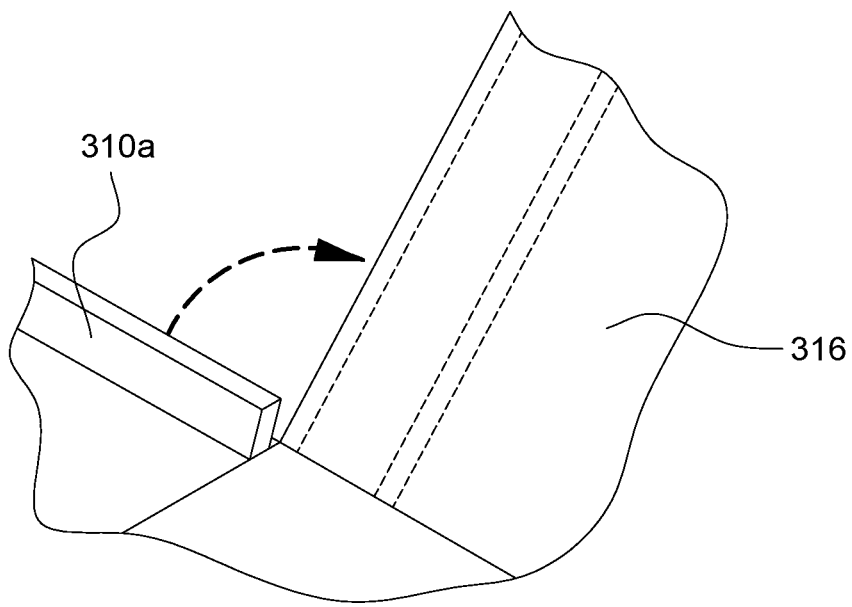
FIG. 17C is a close up perspective detail of an inside corner of the cart, taken along circle dashed line "17C" of FIG. 17, whosn in an open position.
Figure 17D:
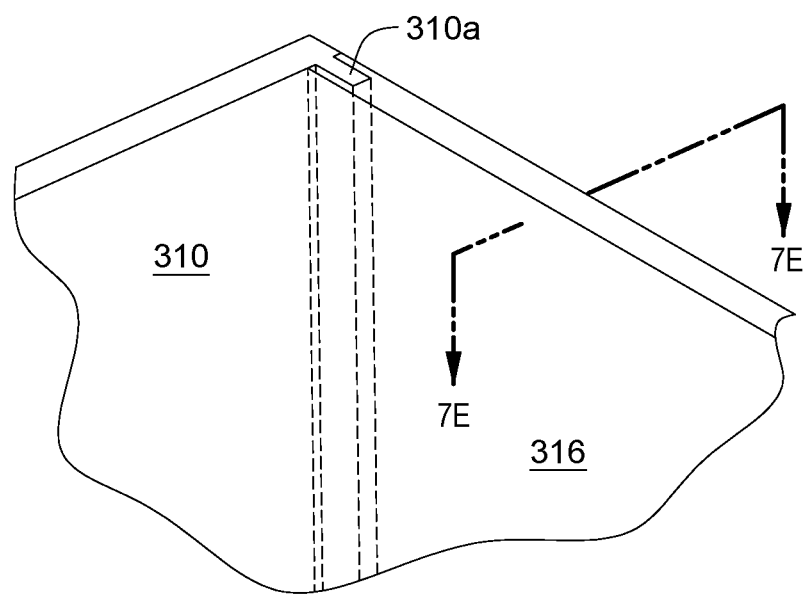
FIG. 17D is a close up perspective detail view of the inside corner of FIG. C, shown in a closed position where the U-channel is mated with another panel.
Figure 17E:
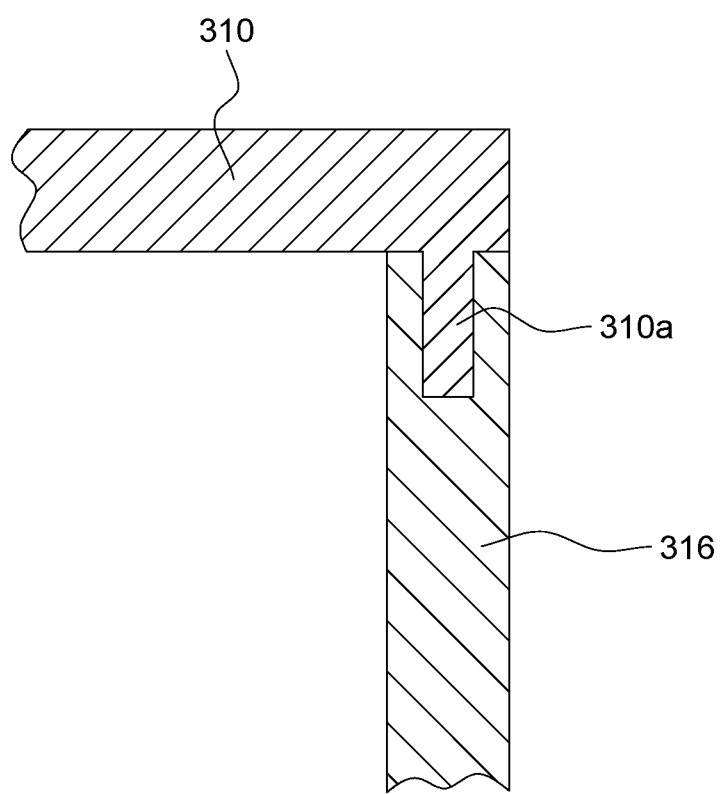
FIG. 17E is a close up detail crossectional view of two joined panels, showing the fit of the U-channels of FIGS. 17, 17C and 17D.

Cart 586 may include the joinable walls of the embodiments shown in FIGS. 1-15 with vertical arrays of nibs, or they may have U-channel or J-channels, such as shown in the water carrying embodiment of a collapsible, reusable push/pull cart 386 of FIG. 16-18.

Cart 586 has a bottom base floor (not shin) with two upwardly foldable end panels 512 and two side panels 514. These end panels and side walls can connect and disconnect in the embodiments shown in FIGS. 1-15 herein, or in FIGS. 16-18 here with carts 386.

The cart 586 also has hook (hitch) 595 on the opposite ends of the cart 586's chassis to hook up the cart 586 from either end with a hitch or manual push/pull rod 670 shown in FIG. 21. The four wheels 591 to this cart will need to be bigger and stronger maybe the size of the wheels used on hospital gurneys.

Carts 586 also have top cover 587 and lower chassis frame 609, and wheel support flange brackets 592 supporting wheels 591 to cart 586. Brake housings 605 and 607 are supplied to the wheels.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method of transporting cargo carrying collapsible carts comprising the steps of:
preloading a bed of a vehicle with push-pull carts containing merchandise for delivery to a number of different destinations, each cart comprising a bottom panel, two pairs of side panels connected to said bottom panel at fold lines, and a top panel joined to a top edge of one of said side panels by a cover fold line, said bottom panel having a rectangular metal frame L-shaped in cross section partially enclosing outer edges of said bottom panel and supporting a circular rotating transporter adjacent each corner thereof;

marking said carts with printed and/or electronically bar-coded identifiable indicia identifying the owner of said cart and a customer destination on each one of said carts;

stacking said carts on said bed when filled by merchandise by placing said circular rotating transporters mounted on a bottom panel of an upper cart in corresponding rectangular shaped recesses in a top panel of a lower cart;

offloading stacks of said carts said bed of said vehicle by rolling said lower cart of each stack of carts down a ramp extending from an edge of said bed to a platform manually using a pulling rod having a hook or other grasping fastener at a distal end thereof engageble with a hitch;

unloading said merchandise from said carts after offloading said carts containing said merchandise associated with said printed and/or electronically bar-coded customer identifiable indicia, thereby obviating the need for use of cargo supporting pallets and associated mechanized fork lifts, said metal frame including a braking system for engaging all wheels simultaneously using side by side brake locking pedal and release pedals mounted on said metal frame at a rear side of said cart, and a housing containing braking elements located over each rotating transporter under said rectangular metal frame;

emptying said carts at assigned destination of each of said carts;

collapsing each cart after being emptied and stacking the collapsed carts by placing said circular rotating transporters of one collapsed cart onto said recesses of said top panel of another collapsed cart; and rolling the stacks of said collapsed empty carts back onto said bed of said vehicle for return for reuse of said collapsed empty carts.

2. The method of claim 1 in which:

in an assembled configuration, said bottom and side panels extending upwardly forming a top opening, said top panel swiveling between a position closing said top opening and a position exposing said top opening; and in a collapsed configuration, said side panels folded inwardly, and said top panel folded over said side panels, said folded panels forming a flat, compact assembly for stacking and storage wherein all of said panels fold within perimeter confines of said metal frame.

3. The method of claim 2 in which said braking system engages all circular rotating transporters simultaneously.

4. The method of claim 3 in which said locking braking pedal has a circular rotating transporter lock position when fully depressed preventing circular rotating transporters from rotating or swiveling regardless of the direction said circular rotating transporters are pointing.

5. The method of claim 4 in which said brake release pedal unlocks said braking pedal.

6. The method of claim 5 in which each side panel is constructed of insulating material for keeping contents of said cart either hot or cold for an extended period of time.

7. The method of claim 2 in which said side panels have releasable attachments where side edges of said side panels meet, said respective releasable attachments each comprising one pair of facing side panels having elongated male members extending along and on both side edges, and another pair of alternating facing side panels having female molded channels along side edges adapted to receive said male members when said side panels are lifted upwardly to form an assembled configuration of said cart, and forming watertight joints between adjacent side panels for storing and shipping liquids.

8. The method of claim 7 in which said bottom panel is contoured so liquid contents of said cart can empty completely.

9. The method of claim 2 in which said side panels have releasable attachments where side edges of said side panels meet, said respective releasable attachments each comprising one pair of facing side panels having a first elongated array of interlocking nibs extending along and on both side edges, and another pair of alternating facing side panels having a second elongated array of interlocking nibs along side edges adapted to receive said first elongated array of interlocking nibs when said side panels are lifted upwardly to form an assembled configuration of said cart.

10. The method of claim 1 wherein said circular rotating transporters are casters.

11. The method of claim 1 wherein said circular rotating transporters are wheels.

12. A method of transporting fully assembled, collapsible storage cargo carrying carts comprising the steps of:

forming each said cart from a substantially rectangular bottom panel, upwardly extending two pairs of side panels connected to said bottom panel at fold lines, and a cover panel joined to a top edge of one of said side panels by a cover fold line, said cover panel having a rectangular shaped recess adjacent each corner thereof;

providing said bottom panel with structure for supporting a circular rotating transporter adjacent each corner thereof, each said circular rotating transporter being aligned with a rectangular shaped recess in said cover, said structure comprising a rectangular metal frame L-shaped in cross section partially enclosing outer edges of said bottom panel;

marking each said cart with printed and/or electronically bar-coded identifiable indicia identifying the owner of said cart and a customer destination on each one of said carts;

loading each cart with cargo;

stacking a plurality of said loaded carts by placing an upper cart on a lower cart with circular rotating transporters of said upper cart resting in said recesses of said lower cart;

loading one or more stacks of said carts onto a bed of a vehicle;

using said circular rotating transporters on a bottom cart in each stack to position said carts on said bed of said vehicle;

driving said vehicle to a destination; offloading said stacks of carts for delivery of cargo within said carts to a customer associated with said printed and/or electronically bar-coded identifiable indicia, thereby obviating the need for use of cargo supporting pallets and associated mechanized fork lifts;

in which watertight joints are formed between adjacent side panels using releasable attachments where side edges of said side panels meet; and, in which said structure includes a braking system for locking and unlocking simultaneously all four circular rotating transporters, said metal frame having a braking system for engaging all wheels simultaneously using side by side brake locking and brake release pedals, and a housing containing braking elements located over each rotating transporter and under said metal frame.

13. The method of claim 12 in which said loading and offloading of said stacks is accomplished by rolling said stacks up or down a ramp extending from an edge of said bed to a platform.

14. The method of claim 12 in which said panels are constructed of plastic material used to store food and water.

15. The method of claim 12 where said releasable attachments each comprises one pair of facing side panels each having male members on both side edges, and another pair of alternating facing side panels having female molded channels along side edges adapted to receive said male members when said side panels are lifted upwardly to form an assembled configuration of said cart.

16. The method of claim 12 wherein said circular rotating transporters are selected from the group consisting of casters and wheels.

17. The method of claim 12 where said releasable attachments each comprises one pair of facing side panels each having a first array of interlocking nibs on both side edges, and another pair of alternating facing side panels having a second array of interlocking nibs along side edges adapted to receive said first array of interlocking nibs when said side panels are lifted upwardly to form an assembled configuration of said cart.

18. The method of claim 12 wherein said panels are folded within a perimeter confines of said structure when said panels are folded down during disassembly of said cart.

* * * * *